United States Patent
Iwamoto

(10) Patent No.: US 12,535,664 B2
(45) Date of Patent: Jan. 27, 2026

(54) ZOOM LENS, IMAGE PICKUP APPARATUS, AND IMAGE PICKUP SYSTEM

(71) Applicant: CANON KABUSHIKI KAISHA, Tokyo (JP)

(72) Inventor: Shunji Iwamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 281 days.

(21) Appl. No.: 18/507,143

(22) Filed: Nov. 13, 2023

(65) Prior Publication Data

US 2024/0192474 A1    Jun. 13, 2024

(30) Foreign Application Priority Data

Dec. 1, 2022  (JP) .................... 2022-192641

(51) Int. Cl.
  G02B 15/14    (2006.01)
(52) U.S. Cl.
  CPC ................. G02B 15/1441 (2019.08)
(58) Field of Classification Search
  CPC .................................................. G02B 15/1441
  USPC .......................................................... 359/676
  See application file for complete search history.

(56) References Cited

U.S. PATENT DOCUMENTS

| | | | |
|---|---|---|---|
| 9,217,851 B2 | 12/2015 | Iwamoto | |
| 10,078,202 B2 | 9/2018 | Iwamoto | |
| 10,416,421 B2 | 9/2019 | Iwamoto | |
| 10,663,703 B2 | 5/2020 | Iwamoto | |
| 10,754,169 B2 | 8/2020 | Iwamoto | |
| 11,131,829 B2 | 9/2021 | Iwamoto | |
| 11,181,717 B2 | 11/2021 | Iwamoto | |
| 11,841,489 B2 | 12/2023 | Iwamoto | |
| 2014/0055659 A1 | 2/2014 | Iwamoto | |
| 2021/0088763 A1* | 3/2021 | Yonezawa | .......... G02B 15/1451 |
| 2023/0010047 A1 | 1/2023 | Iwamoto | |
| 2023/0266583 A1 | 8/2023 | Iwamoto | |
| 2023/0384570 A1 | 11/2023 | Iwamoto | |
| 2024/0053591 A1 | 2/2024 | Iwamoto | |
| 2024/0061224 A1 | 2/2024 | Iwamoto | |
| 2024/0159996 A1 | 5/2024 | Iwamoto | |
| 2024/0176118 A1 | 5/2024 | Nakada | |

FOREIGN PATENT DOCUMENTS

JP    2020-134807 A    8/2020

* cited by examiner

*Primary Examiner* — William Choi
(74) *Attorney, Agent, or Firm* — Carter, DeLuca & Farrell LLP

(57) ABSTRACT

A zoom lens includes, in order from an object side to an image side, a first lens unit having positive refractive power, a second lens unit having negative refractive power, a third lens unit having positive refractive power, and a rear group. A distance between adjacent lens units changes during zooming from a wide-angle end to a telephoto end. The first lens unit is fixed relative to an image plane during zooming from the wide-angle end to the telephoto end. The first lens unit includes single lens having negative refractive power closest to an object, and a plurality of lenses having positive refractive powers disposed on the image side of the single lens. An air lens is formed by an air gap between the single lens and a lens adjacent to and disposed on the image side of the single lens. A predetermined inequality is satisfied.

20 Claims, 15 Drawing Sheets

ZOOM LENS, IMAGE PICKUP APPARATUS, AND IMAGE PICKUP SYSTEM

BACKGROUND

Technical Field

One of the aspects of the embodiments relates to generally to a zoom lens, and more particularly to a zoom lens suitable for an optical apparatus, such as a digital still camera, a digital video camera, a surveillance camera, and an on-board camera (in-vehicle camera).

Description of Related Art

A zoom lens is demanded to have a compact and lightweight overall system, high optical performance in which various aberrations including chromatic aberration are well corrected, a short focal length at a wide-angle end, a large magnification variation ratio, a small F-number, a large aperture ratio, easy manufacturability, and high-speed zoom operation ability.

Japanese Patent Laid-Open No. 2020-134807 discloses a zoom lens consisting of, in order from an object side to an image side, a first lens unit having positive refractive power and fixed relative to the image plane, a second lens unit having negative refractive power, a third lens unit having positive refractive power, and a rear group including a plurality of lens units.

However, the zoom lens disclosed in Japanese Patent Laid-Open No. 2020-134807 is likely to have a large lens diameter because of its small F-number, and the large diameter of the front lens increases the size and weight of the zoom lens. In addition, in an attempt to increase the refractive power of the second lens unit to reduce the diameter of the front lens, it becomes difficult to achieve high image quality.

SUMMARY

A zoom lens according to one aspect of the embodiment includes a plurality of lens units. The plurality of lens units consists of, in order from an object side to an image side, a first lens unit having positive refractive power, a second lens unit having negative refractive power, a third lens unit having positive refractive power, and a rear group including two or more lens units. A distance between adjacent lens units changes during zooming from a wide-angle end to a telephoto end. The first lens unit is fixed relative to an image plane during zooming from the wide-angle end to the telephoto end. The first lens unit includes single lens having negative refractive power closest to an object, and a plurality of lenses having positive refractive powers disposed on the image side of the single lens. An air lens is formed by an air gap between the single lens and a lens adjacent to and disposed on the image side of the single lens. The following inequalities are satisfied:

$$-0.7 < (r112 + r111)/(r112 - r111) < 0.4$$

$$1.0 < f1/(-f2) < 4.2$$

$$0.1 < T1/f1 < 0.65$$

where r111 is a radius of curvature of a lens surface on the object side of the single lens, r112 is a radius of curvature of a lens surface on the image side of the single lens, f1 is a focal length of the first lens unit, f2 is a focal length of the second lens unit, and T1 is a distance on an optical axis from a lens surface closest to the object of the first lens unit to a lens surface closest to the image plane of the first lens unit.

Further features of the disclosure will become apparent from the following description of embodiments with reference to the attached drawings.

DESCRIPTION OF THE EMBODIMENTS

Figure 1:
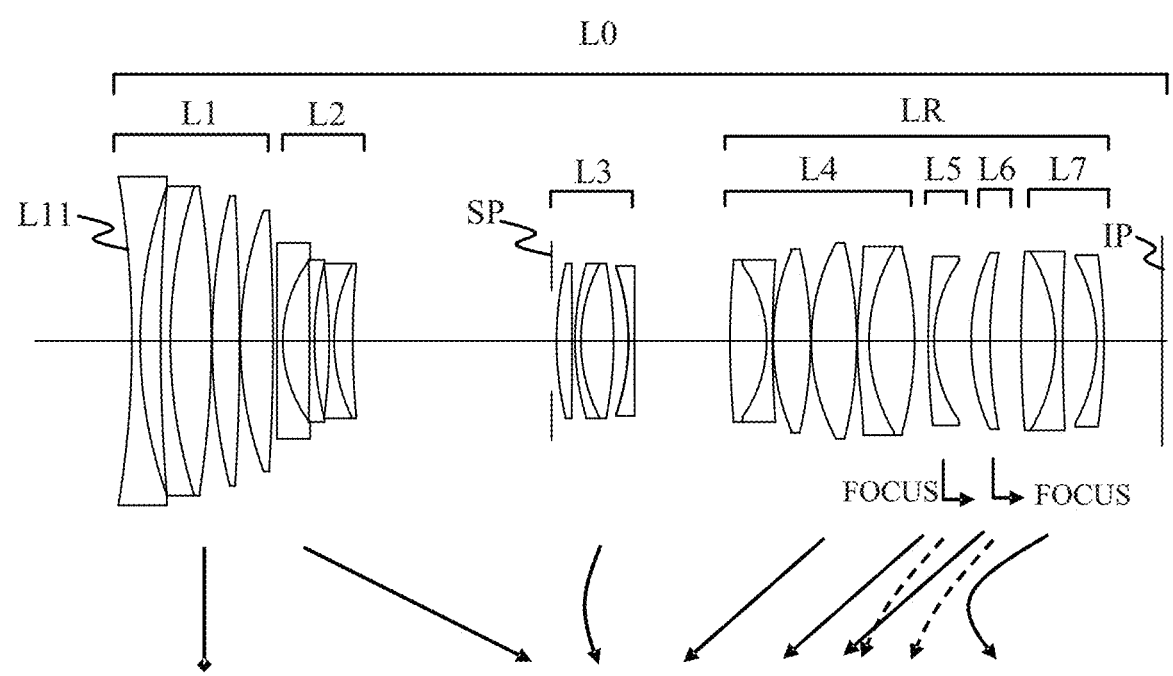
FIG. 1 is a sectional view of a zoom lens according to Example 1.
Figure 2A:
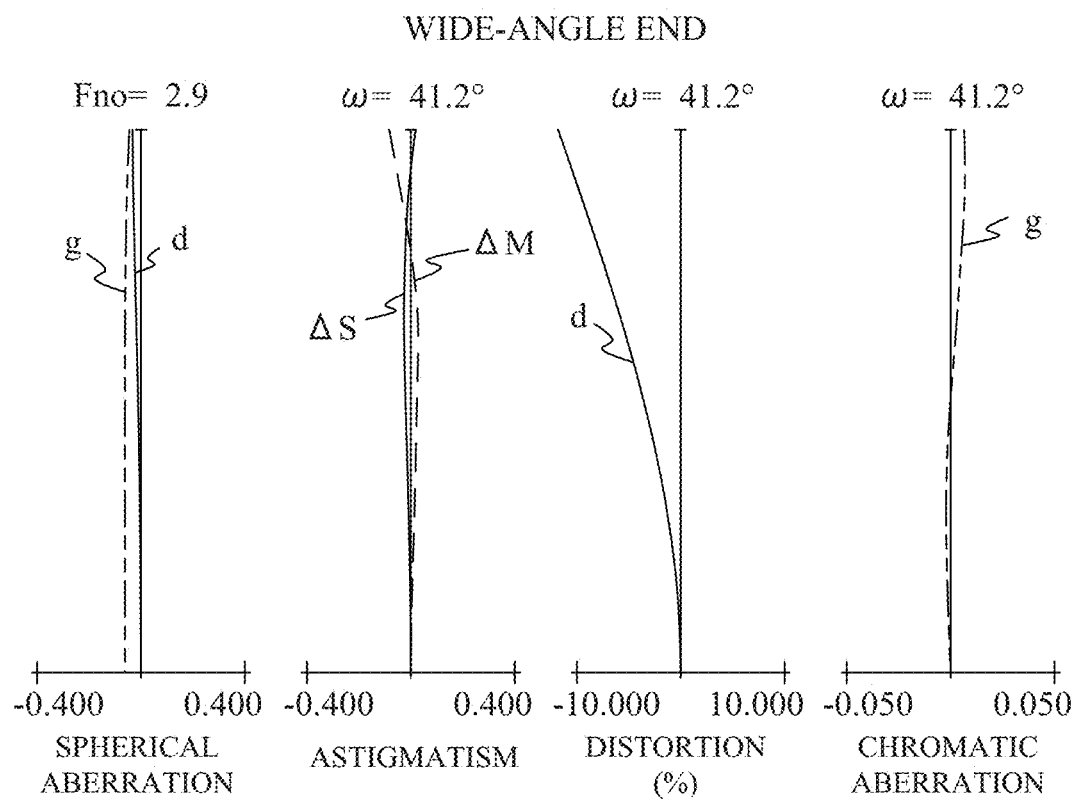
FIGS. 2A and 2B are aberration diagrams at a wide-angle end and a telephoto end of the zoom lens according to Example 1, respectively.
Figure 2B:
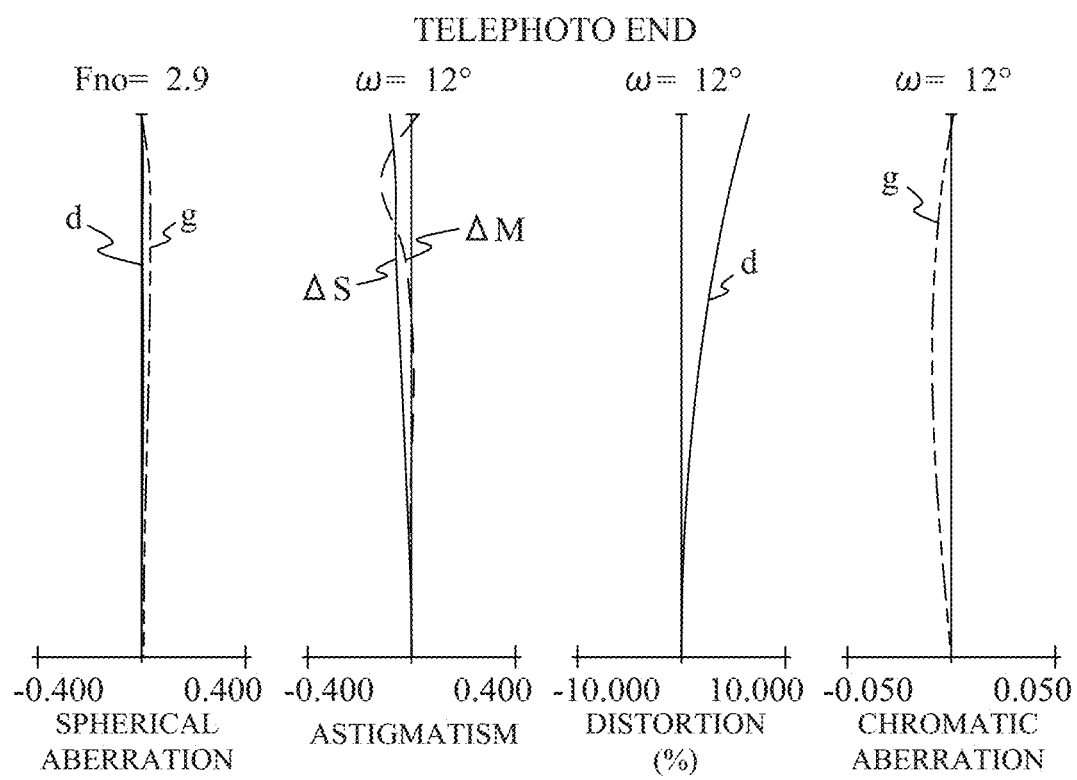
Figure 3:
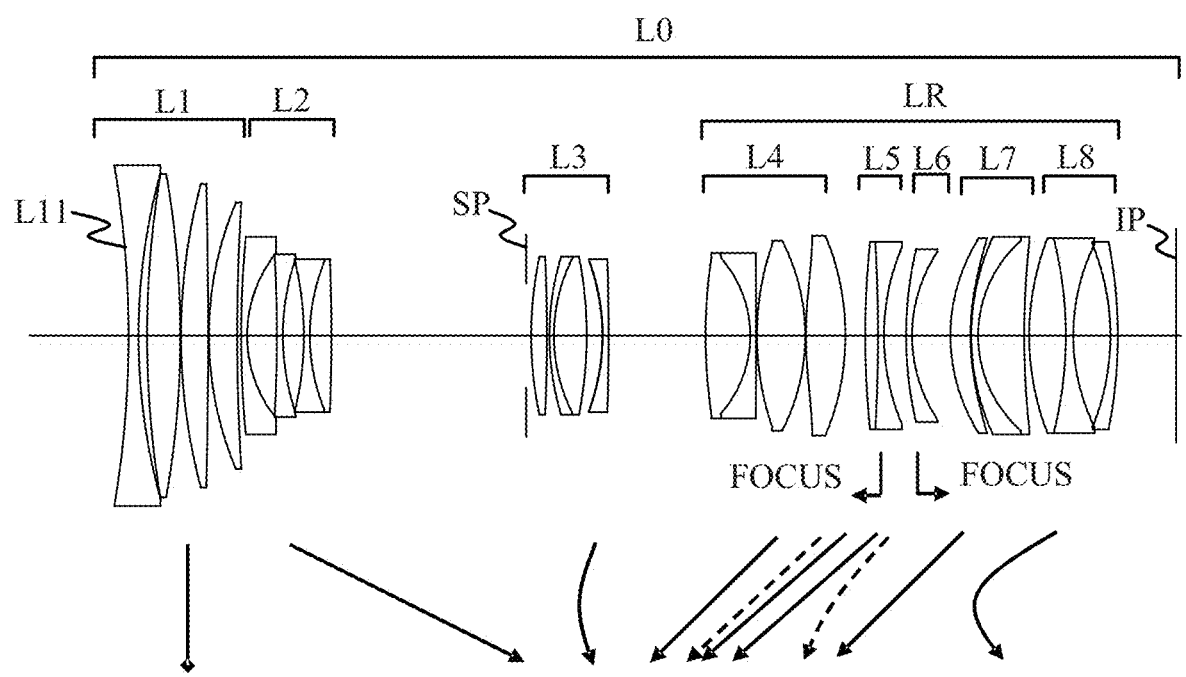
FIG. 3 is a sectional view of a zoom lens according to Example 2.
Figure 4A:
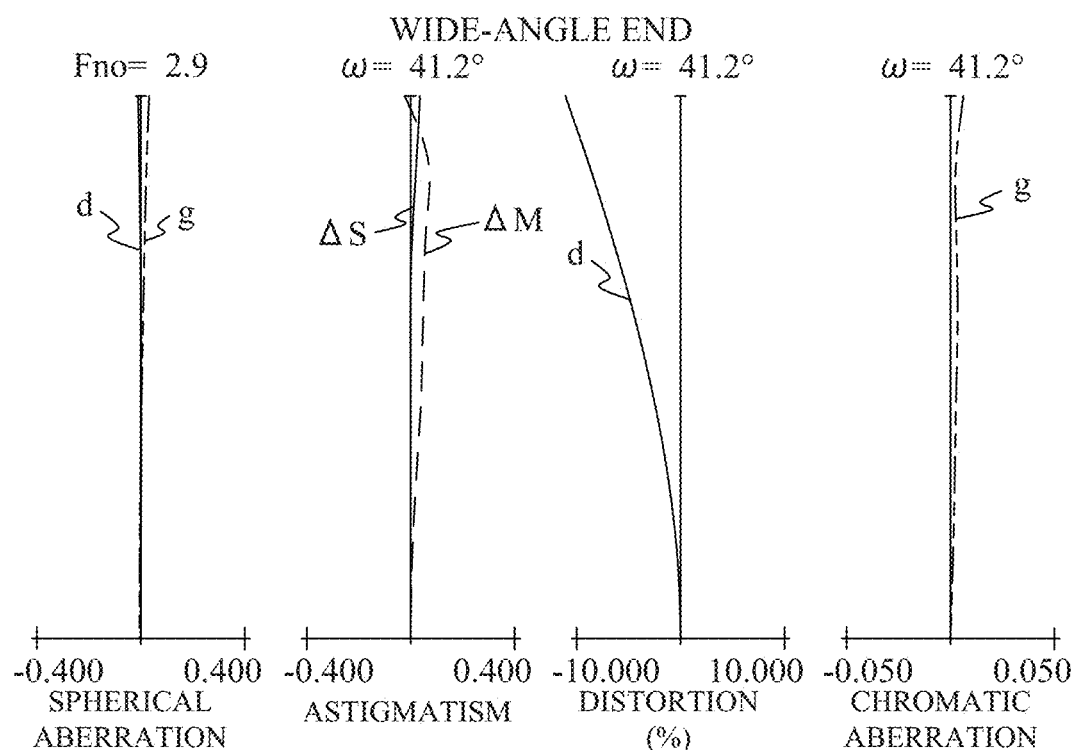
FIGS. 4A and 4B are aberration diagrams at a wide-angle end and a telephoto end of the zoom lens according to Example 2, respectively.
Figure 4B:
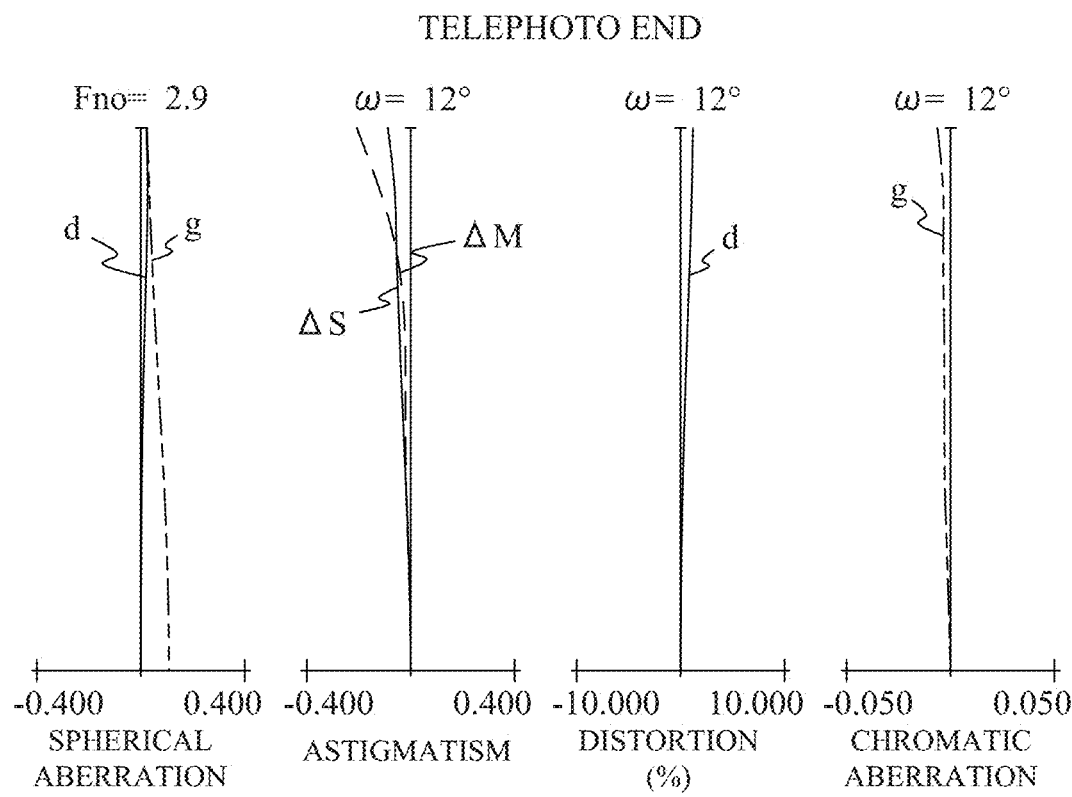
Figure 5:
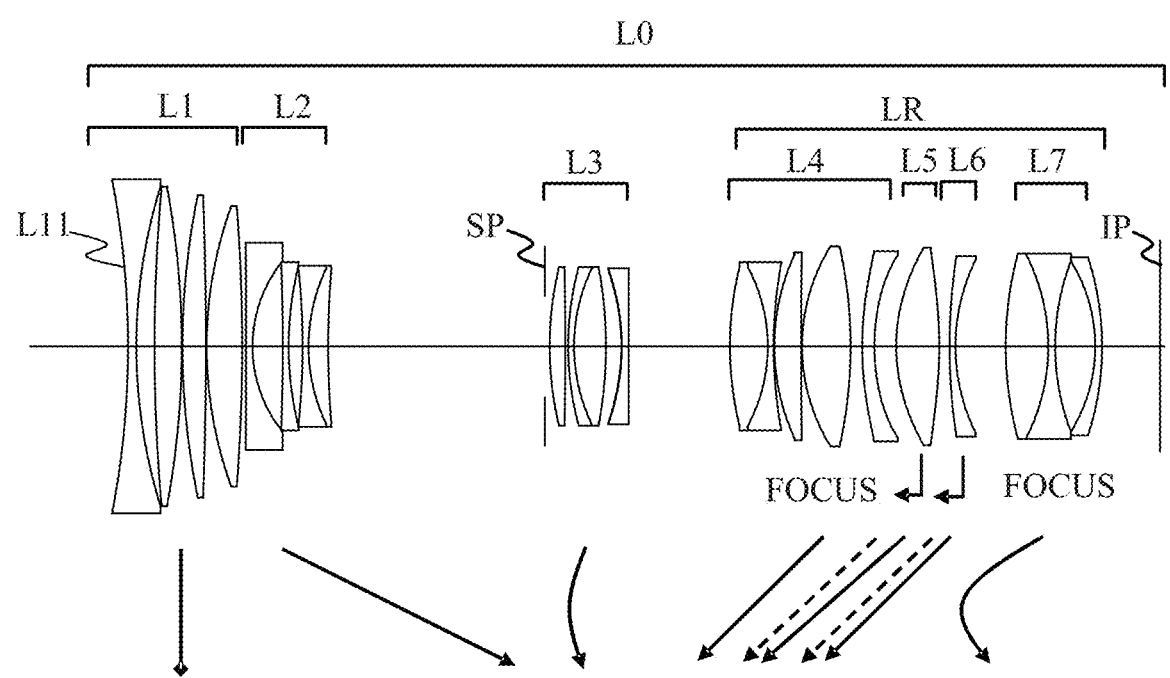
FIG. 5 is a sectional view of a zoom lens according to Example 3.
Figure 6A:
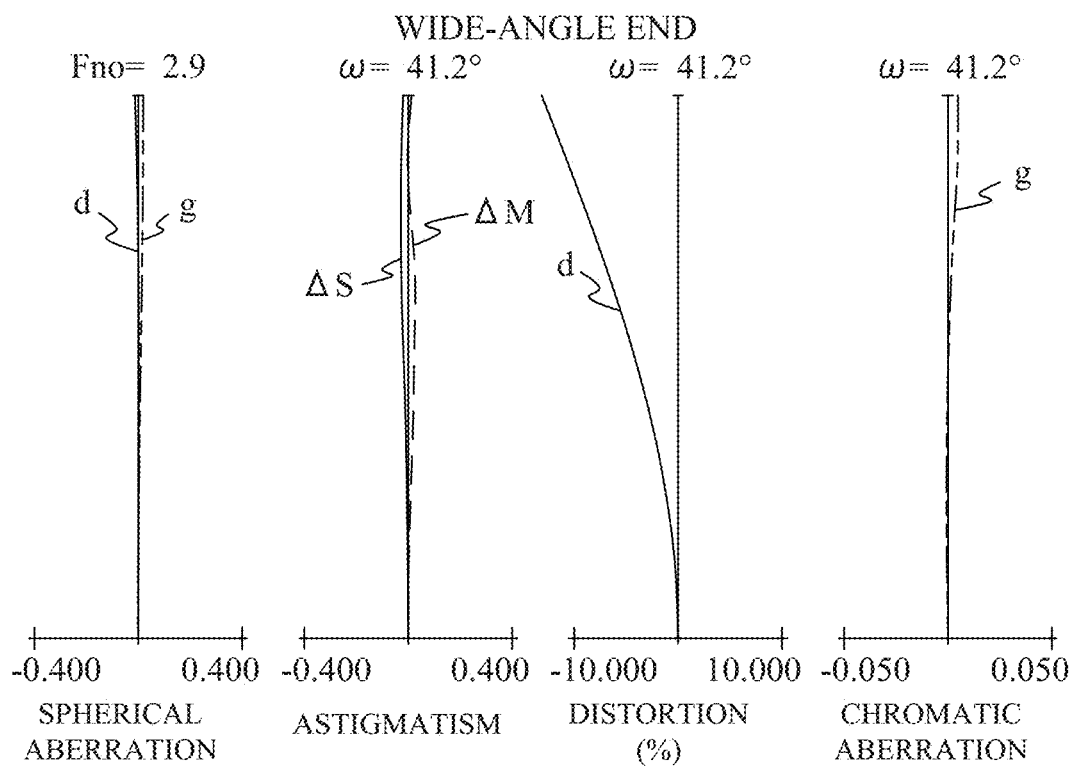
FIGS. 6A and 6B are aberration diagrams at a wide-angle end and a telephoto end of the zoom lens according to Example 3, respectively.
Figure 6B:
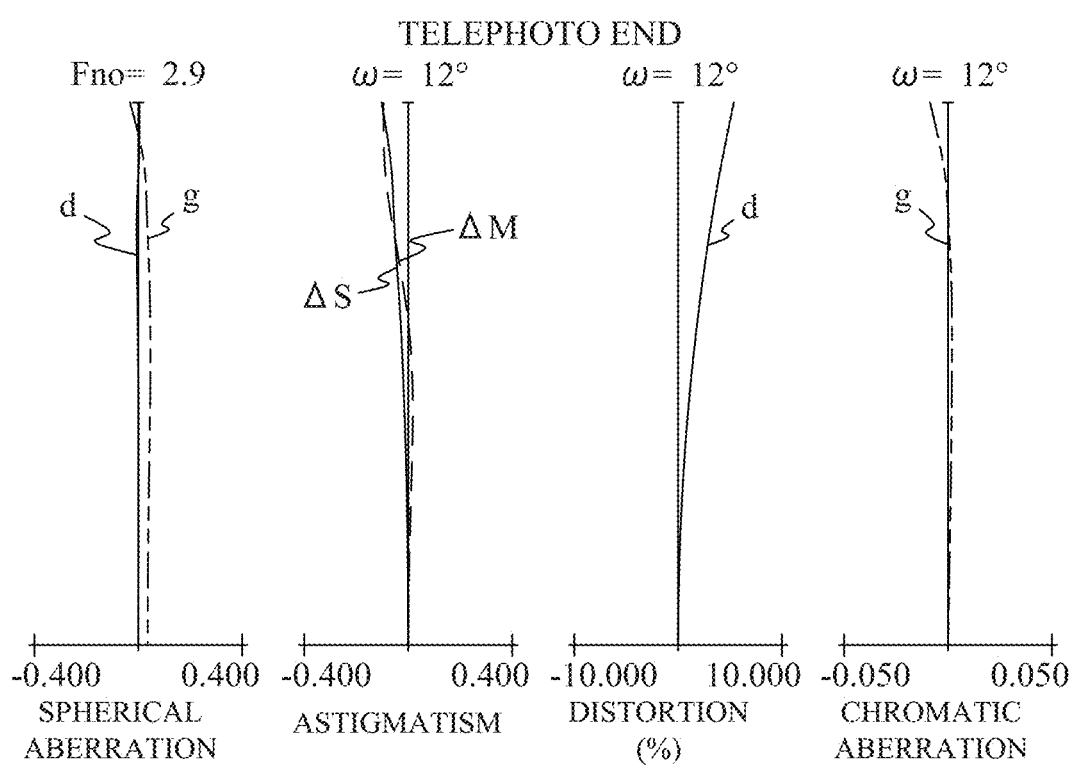
Figure 7:
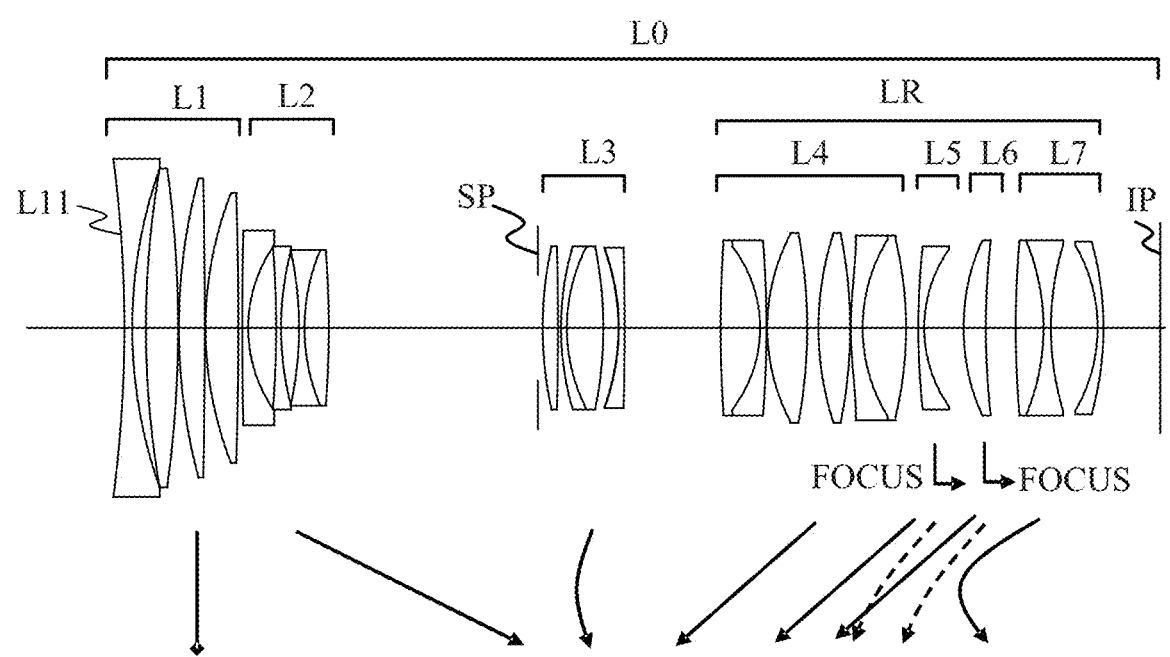
FIG. 7 is a sectional view of a zoom lens according to Example 4.
Figure 8A:
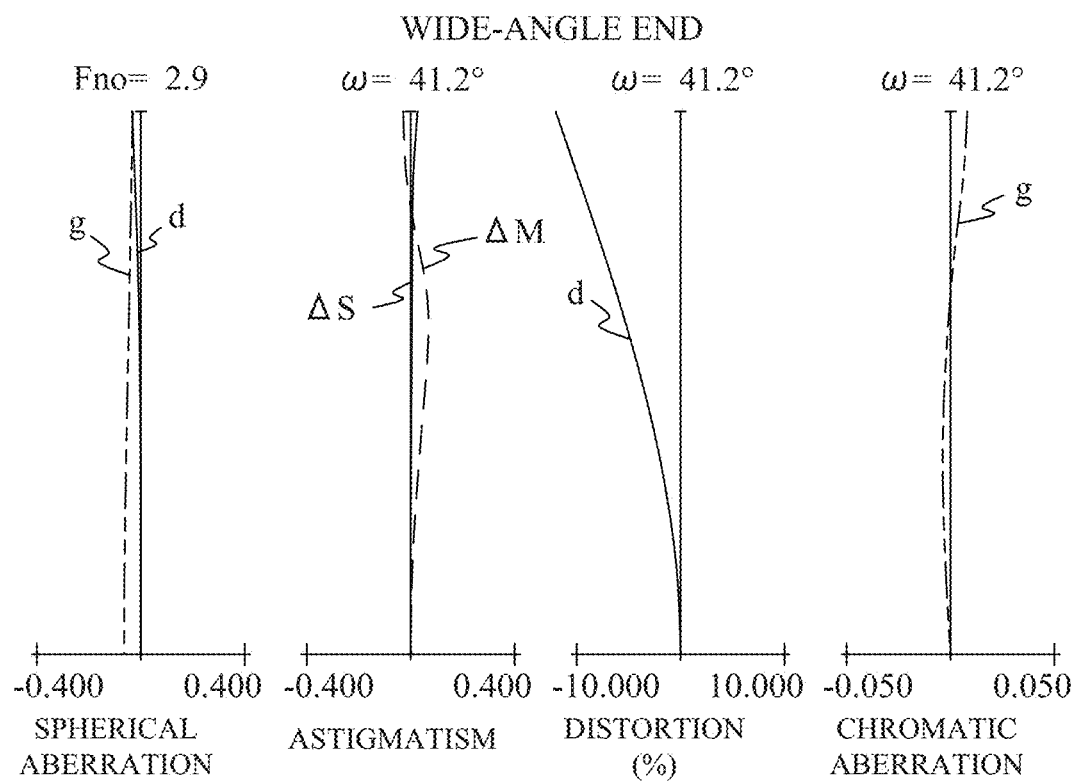
FIGS. 8A and 8B are aberration diagrams at a wide-angle end and a telephoto end of the zoom lens according to Example 4, respectively.
Figure 8B:
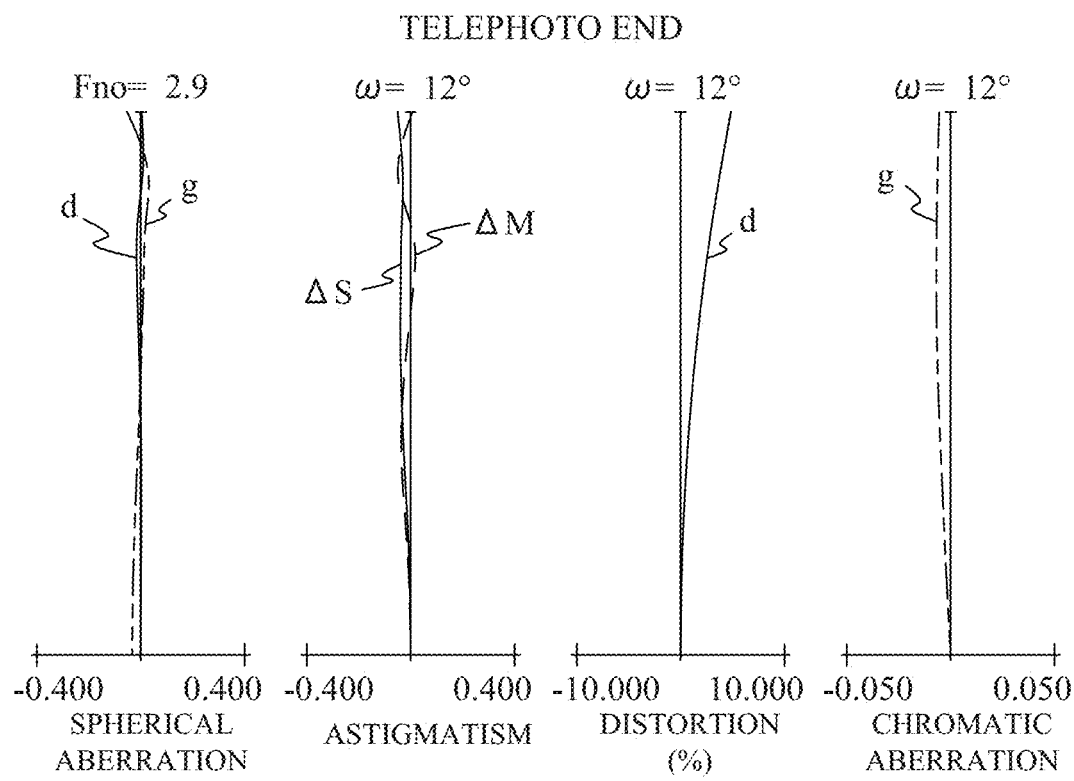
Figure 9:
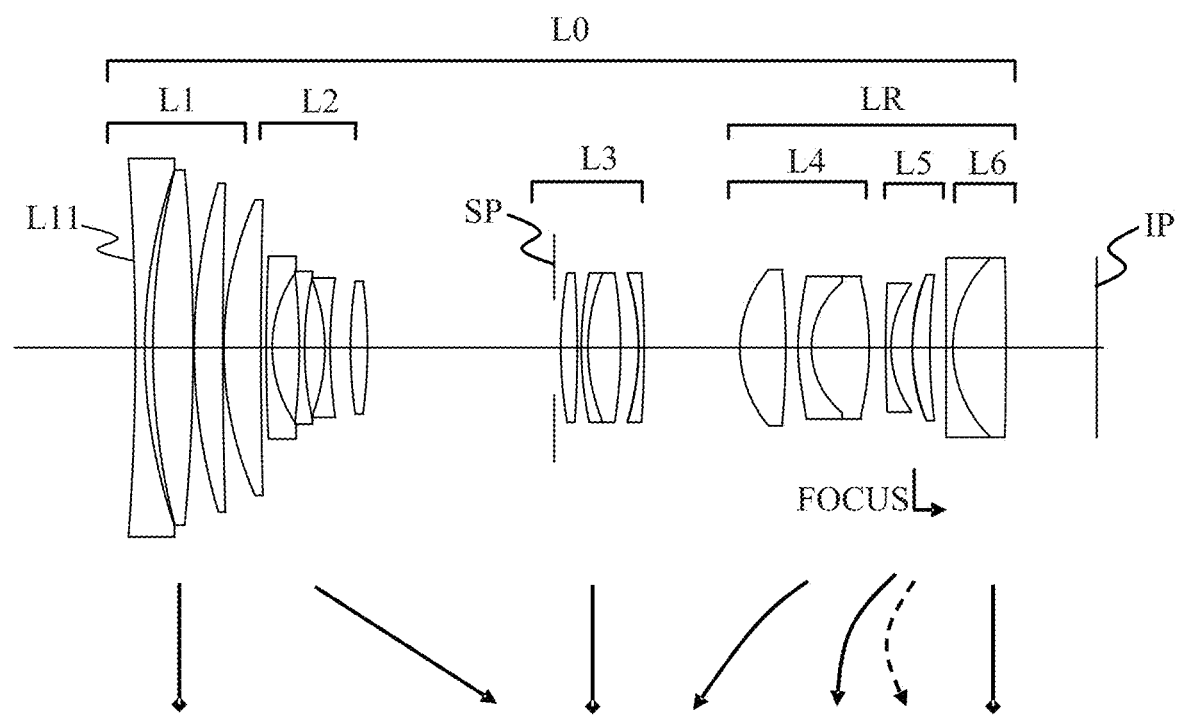
FIG. 9 is a sectional view of a zoom lens according to Example 5.
Figure 10A:
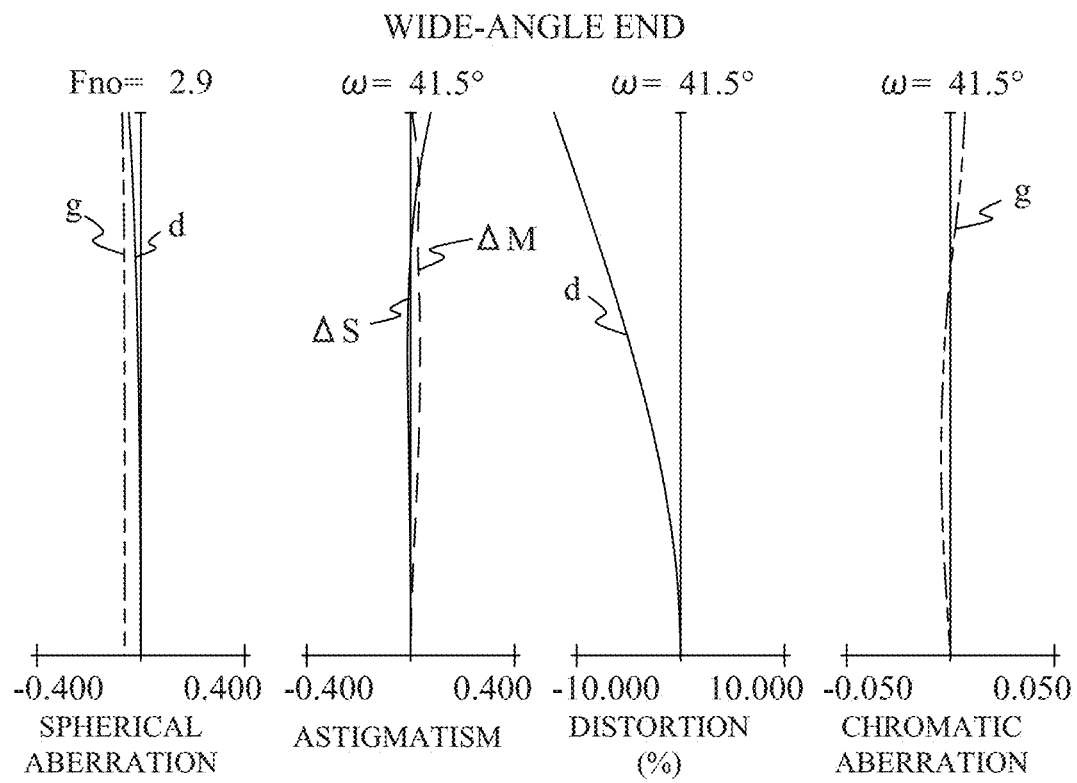
FIGS. 10A and 10B are aberration diagrams at a wide-angle end and a telephoto end of the zoom lens according to Example 5, respectively.
Figure 10B:
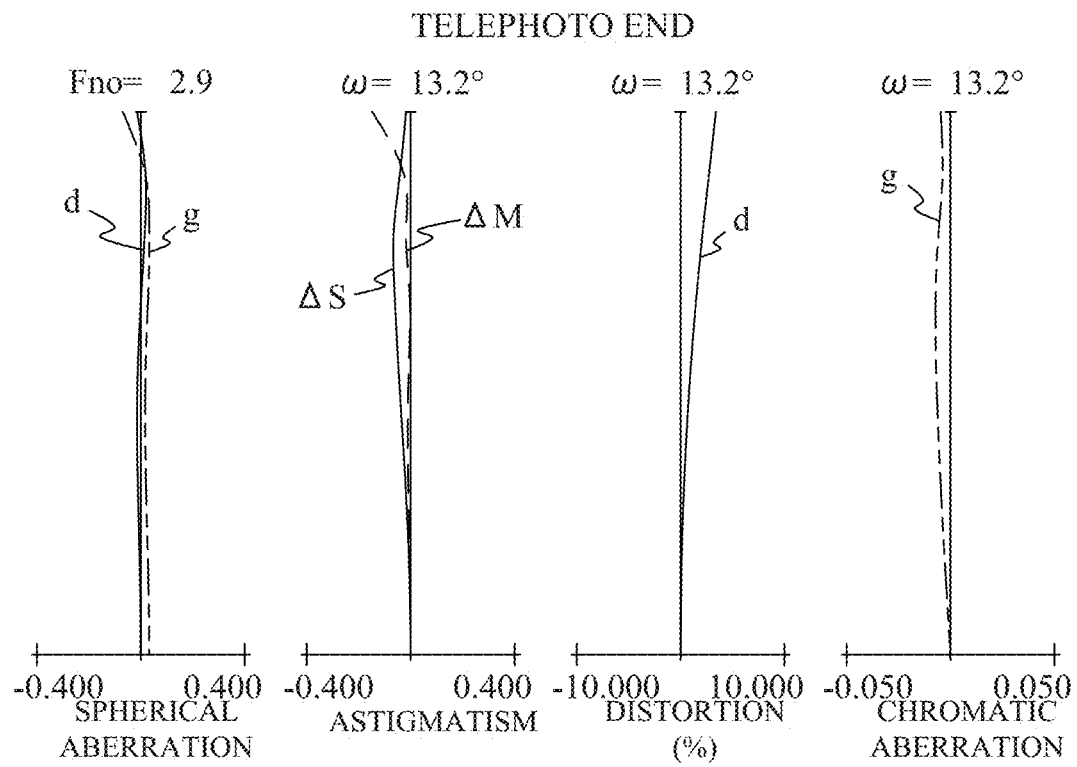
Figure 11:
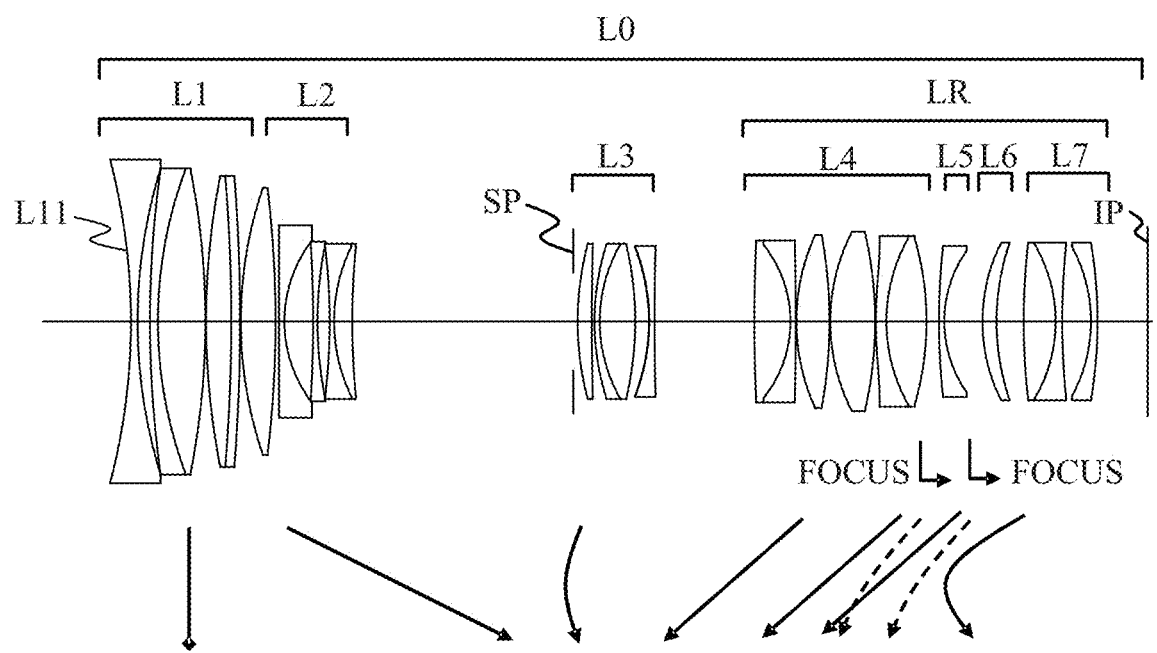
FIG. 11 is a sectional view of a zoom lens according to Example 6.
Figure 12A:
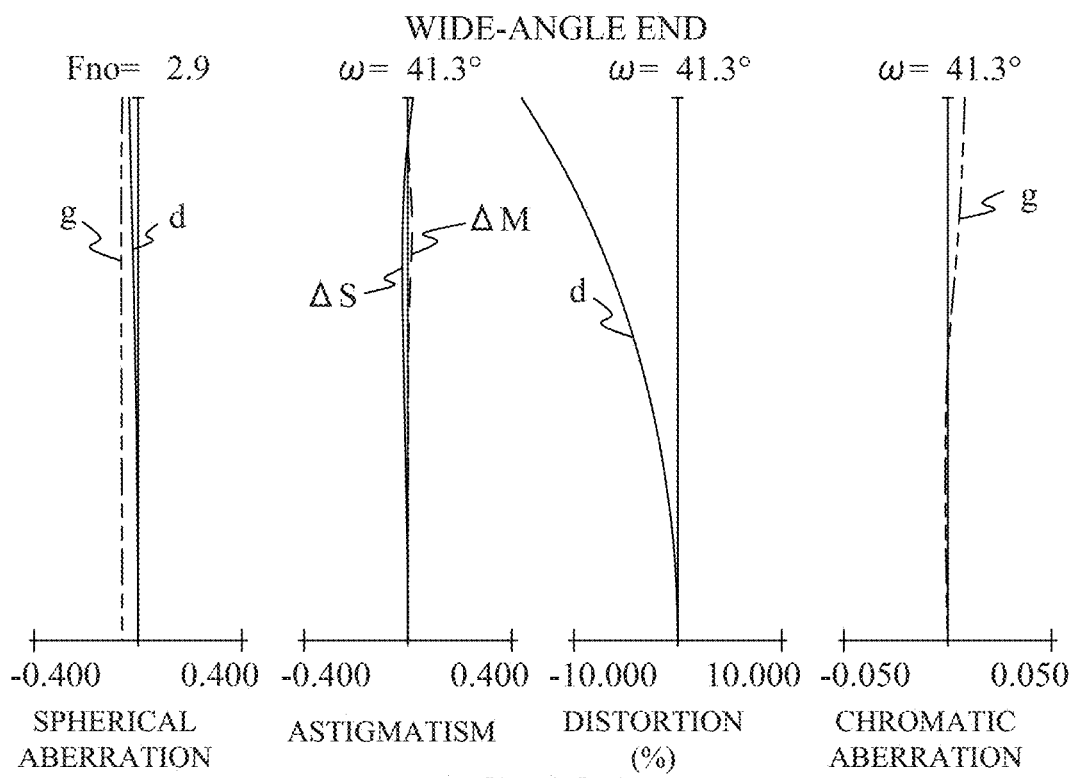
FIGS. 12A and 12B are aberration diagrams at a wide-angle end and a telephoto end of the zoom lens according to Example 6, respectively.
Figure 12B:
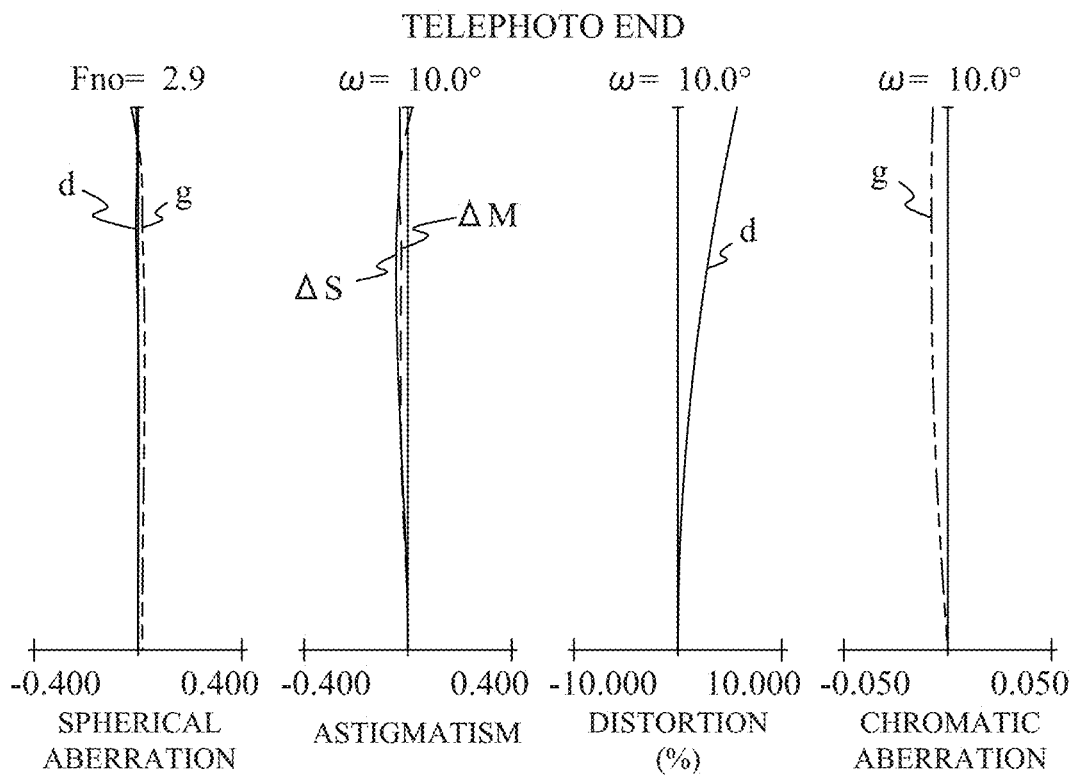
Figure 13:
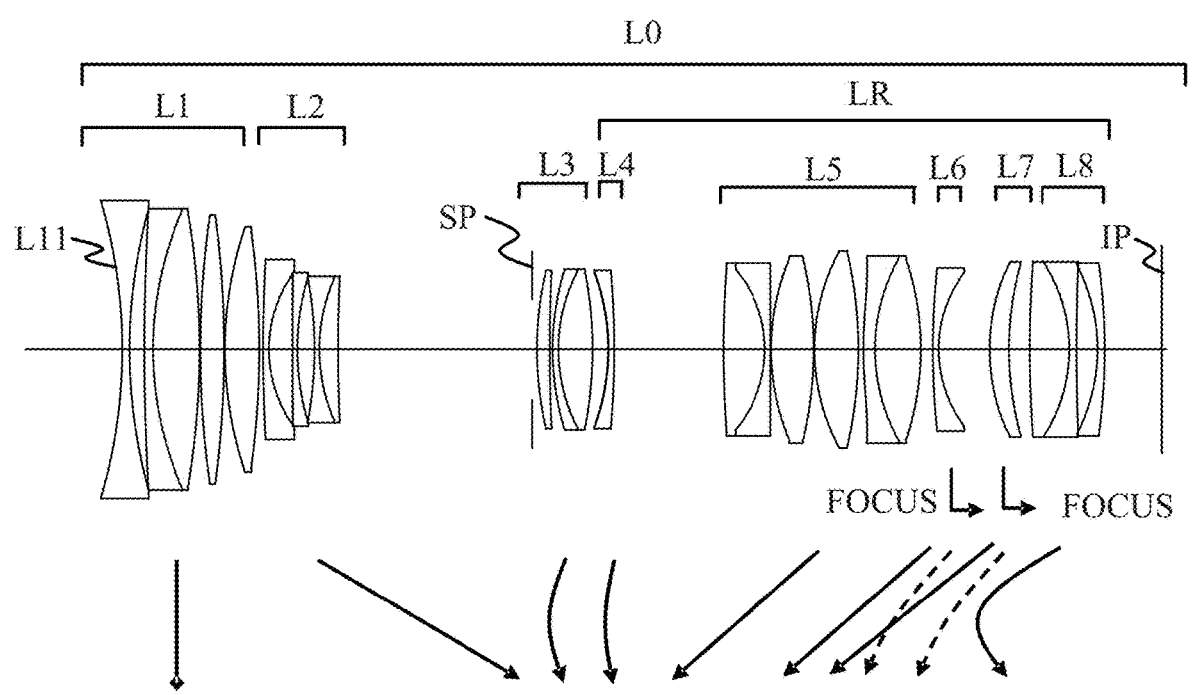
FIG. 13 is a sectional view of a zoom lens according to Example 7.
Figure 14A:
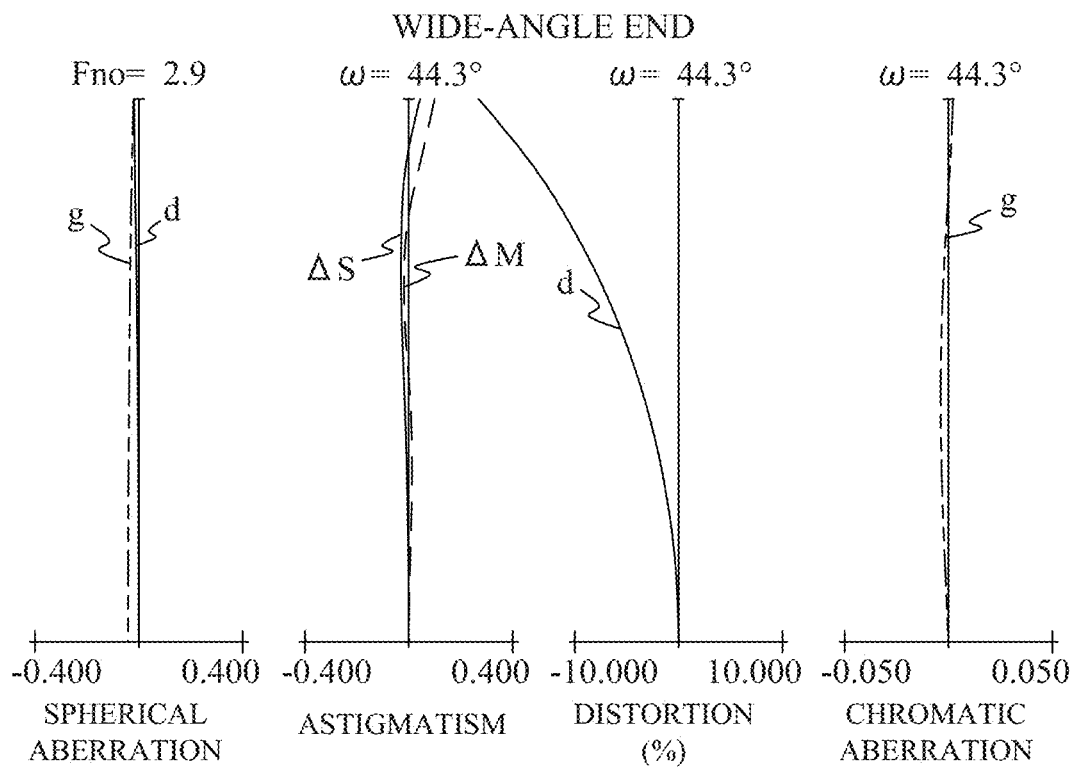
FIGS. 14A and 14B are aberration diagrams at a wide-angle end and a telephoto end of the zoom lens according to Example 7, respectively.
Figure 14B:
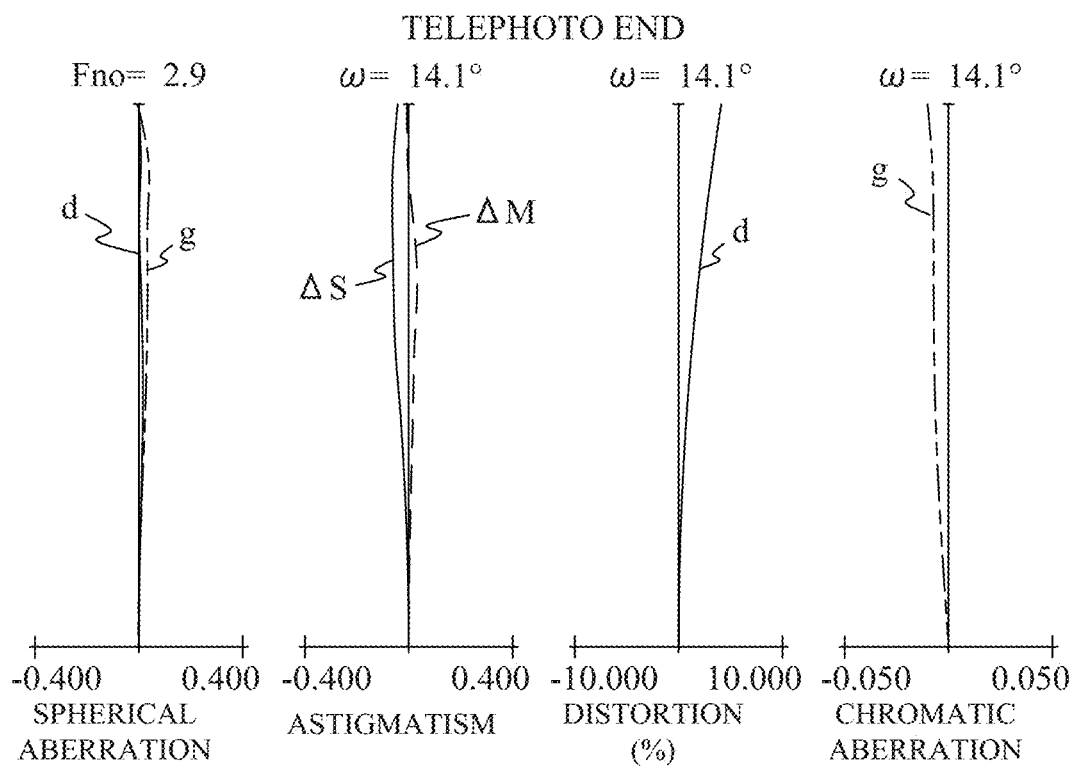

Referring now to the accompanying drawings, a description will be given of a zoom lens, an image pickup apparatus, and an image pickup system according to the disclosure.

FIGS. 1, 3, 5, 7, 9, 11, and 13 are lens sectional views of zoom lenses L0 according to Examples 1 to 7, respectively, in in-focus states at infinity at a wide-angle end. The zoom lens L0 according to each example is a zoom lens for an image pickup apparatus such as a digital still camera, a digital video camera, a surveillance camera, and an on-board camera (in-vehicle camera).

In each lens sectional view, a left side is an object side (front) and a right side is an image side (back). The zoom lens L0 according to each example includes a plurality of lens units. In this specification, a lens unit is a group of lenses that move or stand still during zooming. That is, in the zoom lens L0 according to each example, a distance between adjacent lens units changes during zooming from the wide-angle end to the telephoto end. The lens unit includes one or more lenses. The lens unit may include an aperture stop.

In each lens sectional view, Li represents an i-th (where i is a natural number) lens unit counted from the object side in the zoom lens L0. LR is a rear group including a plurality of lens units.

SP denotes the aperture stop. IP denotes an image plane, and in a case where the zoom lens L0 according to each example is used as an imaging optical system of a digital still camera or video camera, an imaging plane of a solid-state image sensor (photoelectric conversion element) such as a CCD sensor or CMOS sensor is disposed on the image plane IP. In a case where the zoom lens L0 according to each example is used as an imaging optical system of a film-based camera, a photosensitive plane corresponding to the film plane is placed on the image plane IP.

An arrow in the optical axis direction indicates a moving direction of the focus lens unit during focusing from infinity to the shortest distance (closest distance). A solid-line arrow illustrated below each lens unit indicates a moving locus of each lens unit during zooming from the wide-angle end to the telephoto end during focusing on an object at infinity (infinity object). A dotted arrow illustrated below a predetermined lens unit indicates a moving locus of the predetermined lens unit during zooming from the wide-angle end to the telephoto end during focusing on the shortest distance object.

In each of the following examples, the wide-angle end and the telephoto end refer to zoom positions where the lens unit is mechanically located at both ends of a movable range on the optical axis.

FIGS. 2A, 2B, 4A, 4B, 6A, 6B, 8A, 8B, 10A, 10B, 12A, 12B, 14A, and 14B are aberration diagrams of the zoom lenses L0 according to Examples 1 to 7, respectively in the in-focus states at infinity. FIGS. 2A, 4A, 6A, 8A, 10A, 12A, and 14A illustrate the aberration diagrams at the wide-angle end, and FIGS. 2B, 4B, 6B, 8B, 10B, 12B, and 14B illustrate the aberration diagrams at the telephoto end.

In a spherical aberration diagram, Fno denotes an F-number. The spherical aberration diagram illustrates spherical aberration amounts for the d-line (wavelength 587.6 nm) and g-line (wavelength 435.84 nm). In an astigmatism diagram, ΔS indicates an astigmatism amount on a sagittal image plane, and ΔM indicates an astigmatism amount on a meridional image plane. A distortion diagram illustrates a distortion amount for the d-line. A chromatic aberration diagram illustrates a chromatic aberration amount for the g-line. ω denotes a half angle of view (°) (angle of view in paraxial calculation).

Next, the characteristic configuration of the zoom lens L0 according to each example will be described.

In order to reduce the diameter of the front lens, it is important to properly set the configuration of the first lens unit L1 and the power arrangement of each lens unit. In particular, increasing the refractive power of the negative lens placed on the object side can effectively reduce the diameter of the front lens. However, in a case where the refractive power of the negative lens placed on the object side becomes too strong, it becomes difficult to correct distortion. Therefore, in order to obtain the zoom lens L0 having a high magnification variation ratio, a large aperture ratio, a compact size, reduced weight, high image quality, and high-speed zoom operation ability, the arrangement of the lenses and lens units in the zoom lens L0 may be properly set.

The zoom lens L0 according to each example consists of, in order from the object side to the image side, a first lens unit L1 having positive refractive power, a second lens unit L2 having negative refractive power, a third lens unit L3 having positive refractive power, and a rear group LR including a plurality of lens units. In the zoom lens L0 according to each example. A distance between adjacent lens units changes during zooming from the wide-angle end to the telephoto end. The first lens unit L1 is fixed relative to the image plane IP during zooming from the wide-angle end to the telephoto end.

A zoom lens with a high magnification variation ratio and a large aperture ratio tends to have a large front lens diameter, resulting in a large mass. Therefore, fixing the first lens unit L1 during zooming can easily provide a high-speed zoom operation.

The rear group LR includes a plurality of lens units, and a distance between adjacent lens units changes during zooming. Changing the distance between adjacent lens units in the lens units constituting the rear group LR can easily suppress aberration fluctuations during zooming, and provide high image quality.

In the zoom lens L0 according to each example, the first lens unit L1 includes a single focal length lens L11 having negative refractive power disposed closest to the object and a plurality of lenses having positive refractive powers and disposed on the image side of the single lens L11. An air lens is formed by an air gap between the single lens L11 and a lens adjacent to and disposed on the image side of the single lens L11. This makes it easy to reduce the diameter of the front lens.

The zoom lens L0 according to each example satisfies the following inequalities (1) and (2):

$$-0.7<(r112+r111)/(r112-r111)<0.4 \qquad (1)$$

$$1.0<f1/(-f2)<4.2 \qquad (2)$$

where r111 is a radius of curvature of a lens surface on the object side of the single lens L11, r112 is a radius of curvature of a lens surface on the image side of the single lens L11, f1 is a focal length of the first lens unit L1, and f2 is a focal length of the second lens unit L2.

Inequality (1) defines a shape of the single lens L11. In a case where the value becomes higher than the upper limit of inequality (1), it becomes difficult to correct distortion at the wide-angle end. In a case where the value becomes lower than the lower limit of inequality (1), it becomes difficult to reduce the diameter of the front lens.

Inequality (2) defines a ratio of the focal length of the first lens unit L1 to the focal length of the second lens unit L2. In a case where the value becomes higher than the upper limit of inequality (2), it becomes difficult to correct various aberrations in the second lens unit L2, particularly distortion at the wide-angle end and spherical aberration at the telephoto end. In a case where the value becomes lower than the lower limit of inequality (2), it becomes difficult to reduce the diameter of the front lens.

Inequalities (1) and (2) may be replaced with the following inequalities (1a) and (2a):

$$-0.68<(r112+r111)/(r112-r111)<0.20 \qquad (1a)$$

$$2.00<f1/(-f2)<4.09 \qquad (2a)$$

Inequalities (1) and (2) may be replaced with the following inequalities (1b) and (2b):

$$-0.67<(r112+r111)/(r112-r111)<0.10 \qquad (1b)$$

$$2.50<f1/(-f2)<4.03 \qquad (2b)$$

A description will be given of a configuration that may be satisfied in the zoom lens L0 according to each example.

In the zoom lens L0 according to each example, the first lens unit L1 may include three or more lenses having positive refractive powers disposed on the image side of the single lens L11. If the first lens unit L1 has three or more lenses having positive refractive powers, it becomes easy to shorten the overall length of the zoom lens L0 and miniaturize the zoom lens L0.

In the zoom lens L0 according to each example, the rear group LR may consist of three or more lens units. Since the rear group LR includes three or more lens units, it becomes easy to correct aberrations during zooming, and achieve high image quality.

In the zoom lens L0 according to each example, the rear group LR may include a plurality of lens units configured to move during zooming from the wide-angle end to the telephoto end. At least two of the lens units included in the rear group LR move during zooming, thereby facilitating a high magnification variation ratio. At least two of the lens units included in the rear group LR may move toward the object side during zooming from the wide-angle end to the telephoto end.

In the zoom lens L0 according to each example, all lenses included in the first lens unit L1 may be fixed during focusing. In the zoom lens L0 according to each example, the rear group LR may include a lens unit that moves during focusing. A focus driving mechanism can be simple by fixing the first lens unit L1 during focusing, which has a large lens diameter and large mass and by performing focusing with a part of the lens units included in the rear group LR, which has a relatively small lens diameter, and the zoom lens becomes compact.

In the zoom lens L0 according to each example, the second lens unit L2 may include three or more lenses having negative refractive power. Since the second lens unit L2 includes three or more lenses having negative refractive power, distortion can be easily corrected, especially at the wide-angle end, and high image quality can be achieved.

In the zoom lens L0 according to each example, the third lens unit L3 may include a plurality of lenses having positive refractive powers. If the third lens unit L3 includes two or more lenses having positive refractive powers, spherical aberration can be easily corrected, especially at the telephoto end, and high image quality can be achieved.

In the zoom lens L0 according to each example, the third lens unit L3 may include a lens having negative refractive power. One or more lenses each having negative refractive power in the third lens unit L3 can easily correct longitudinal chromatic aberration, especially at the telephoto end, and achieve high image quality.

A description will now be given of conditions that may be satisfied by the zoom lens L0 according to each example.

The zoom lens L0 according to each example may satisfy one or more of the following inequalities (3) to (12):

$$0.6 < f11/f1 < 1.4 \quad (3)$$

$$0.10 < T1/f1 < 0.65 \quad (4)$$

$$0.5 < -f2/fw < 1.5 \quad (5)$$

$$1 < f3/fw < 10 \quad (6)$$

$$0.2 < BFw/fw < 1.2 \quad (7)$$

$$0.9 < D12t/fw < 2.5 \quad (8)$$

$$0.9 < f21/f2 < 1.8 \quad (9)$$

$$-2.0 < B2t < -0.3 \quad (10)$$

$$0.02 < T11/fw < 0.20 \quad (11)$$

$$0.03 < D112/fw < 0.30 \quad (12)$$

Here, f11 is a focal length of the single lens L11. f1 is a focal length of the first lens unit L1. T1 is a distance on the optical axis from the lens surface closest to the object of the first lens unit L1 to the lens surface closest to the image plane of the first lens unit L1. f2 is a focal length of the second lens unit L2. fw is a focal length of the zoom lens in an in-focus state at infinity at the wide-angle end. f3 is a focal length of the third lens unit L3. BFw is a back focus of the zoom lens L0 in an in-focus state at infinity at the wide-angle end. The back focus is an air converted value of the distance on the optical axis from the final lens surface (surface closest to the image plane) to the image plane IP. D12t is a distance on the optical axis from the lens surface of the first lens unit L1 closest to the image plane to the lens surface of the second lens unit L2 closest to the object at the telephoto end. f21 is a focal length of the lens closest to the object in the second lens unit L2. B2t is the imaging lateral magnification of the second lens unit L2 at the telephoto end. T11 is a distance on the optical axis from a lens surface on the object side of the single lens L11 to a lens surface on the image side of the single lens L11. D112 is a distance on the optical axis from a lens surface on the image side of the single lens L11 to a lens surface on the object side of the lens adjacent to and disposed on the image side of the single lens L11.

Inequality (3) defines a ratio of the focal length of the single lens L11 to the focal length of the first lens unit L1. In a case where the value becomes higher than the upper limit of inequality (3), it becomes difficult to correct distortion at the wide-angle end. In a case where the value becomes lower than the lower limit of inequality (3), it becomes difficult to reduce the diameter of the front lens.

Inequality (4) defines a ratio between the thickness of the first lens unit L1 and the focal length of the first lens unit L1. In a case where the value becomes higher than the upper limit of inequality (4), it is difficult to reduce the diameter of the front lens. In a case where the value becomes the lower limit of inequality (4), the degree of freedom in correcting aberrations decreases, and it becomes difficult to correct various aberrations, especially spherical aberration and coma at the telephoto end.

Inequality (5) defines a ratio of the focal length of the second lens unit L2 to the focal length of the zoom lens L0 at the wide-angle end. In a case where the value becomes higher than the upper limit of inequality (5), it becomes difficult to correct distortion at the wide-angle end. In a case where the value becomes lower than the lower limit of inequality (5), it is difficult to reduce the diameter of the front lens.

Inequality (6) defines a ratio of the focal length of the third lens unit L3 to the focal length of the zoom lens L0 at the wide-angle end. In a case where the value becomes higher than the upper limit of inequality (6), it becomes difficult to correct spherical aberration at the telephoto end. In a case where the value becomes lower than the lower limit of inequality (6), the overall lens length increases and the zoom lens L0 becomes large.

Inequality (7) defines a ratio of the back focus to the focal length of the zoom lens L0 at the wide-angle end. The back focus is defined as a distance on the optical axis from the surface vertex position on the image side of an optical element having refractive power disposed closest to the image plane in the in-focus state at infinity to the image plane IP. In a case where the value becomes higher than the upper limit of inequality (7), the overall lens length becomes longer and the zoom lens L0 becomes large. In a case where the value becomes lower than the lower limit of inequality (7), the rear lens diameter becomes large and the lens weight of the zoom lens L0 increases.

Inequality (8) defines a ratio of the distance between the first lens unit L1 and the second lens unit L2 at the telephoto end and the focal length of the zoom lens at the wide-angle end. In a case where the value becomes higher than the upper limit of inequality (8), the overall lens length increases and the zoom lens L0 becomes large. In a case where the value becomes lower than the lower limit of inequality (8), it becomes difficult to achieve a high ZOOM RATIO.

Inequality (9) defines a ratio of the focal length of a lens disposed closest to the object in the second lens unit L2 and the focal length of the second lens unit L2. In a case where the value becomes higher than the upper limit of inequality (9), it becomes difficult to correct distortion at the wide-angle end. In a case where the value becomes lower than the lower limit of inequality (9), it is difficult to reduce the diameter of the front lens.

Inequality (10) defines the imaging lateral magnification of the second lens unit L2 at the telephoto end. In a case where the value becomes higher than the upper limit of the inequality (10), it becomes difficult to correct spherical aberration at the telephoto end. In a case where the value becomes lower than the lower limit of inequality (10), it becomes difficult to achieve a high magnification variation ratio.

Inequality (11) defines a relationship between the thickness of the single lens L11 and the focal length of the zoom lens L0 at the wide-angle end. In a case where the value becomes higher than the upper limit of the inequality (11), it becomes difficult to reduce the diameter of the front lens. In a case where the value becomes lower than the lower limit of the inequality (11), working becomes difficult, and high image quality becomes difficult.

Inequality (12) defines a relationship between a distance from a lens surface vertex position on the image side of the single lens L11 to a surface vertex position on the object side of a lens disposed adjacent to and disposed on the image side of the single lens L11, and a focal distance of the zoom lens L0 at the wide-angle end. In a case where the value becomes higher than the upper limit of the inequality (12), it becomes difficult to reduce the diameter of the front lens. In a case where the value becomes lower than the lower limit of inequality (12), it is difficult to correct coma at the telephoto end.

Inequalities (3) to (12) may be replaced with the following inequalities (3a) to (12a):

$$0.69 < f11/f1 < 1.21 \tag{3a}$$

$$0.17 < T1/f1 < 0.50 \tag{4a}$$

$$0.75 < -f2/fw < 1.37 \tag{5a}$$

$$1.64 < f3/fw < 8.09 \tag{6a}$$

$$0.33 < BFw/fw < 1.04 \tag{7a}$$

$$1.06 < D12t/fw < 2.10 \tag{8a}$$

$$1.07 < f21/f2 < 1.60 \tag{9a}$$

$$-1.50 < B2t < -0.49 \tag{10a}$$

$$0.04 < T11/fw < 0.15 \tag{11a}$$

$$0.05 < D112/fw < 0.24 \tag{12a}$$

Inequalities (3) to (12) may be replaced with the following inequalities (3b) to (12b):

$$0.74 < f11/f1 < 1.12 \tag{3b}$$

$$0.21 < T1/f1 < 0.43 \tag{4b}$$

$$0.87 < -f2/fw < 1.31 \tag{5b}$$

$$1.96 < f3/fw < 7.14 \tag{6b}$$

$$0.40 < BFw/fw < 0.96 \tag{7b}$$

$$1.14 < D12t/fw < 1.90 \tag{8b}$$

$$1.15 < f21/f2 < 1.50 \tag{9b}$$

$$-1.25 < B2t < -0.58 \tag{10b}$$

$$0.05 < T11/fw < 0.12 \tag{11b}$$

$$0.06 < D112/fw < 0.21 \tag{12b}$$

A detailed description will now be given of the zoom lens L0 according to each example.

The zoom lens L0 according to Example 1 consists of, in order from the object side to the image side, a first lens unit L1 having positive refractive power, a second lens unit L2 having negative refractive power, a third lens unit L3 having positive refractive power, and the rear group LR. The rear group LR includes a fourth lens unit L4 having positive refractive power, fifth lens unit L5 having negative refractive power, sixth lens unit L6 having positive refractive power, and seventh lens unit L7 having negative refractive power. The first lens unit L1 is fixed relative to the image plane IP during zooming. Each lens unit moves along a different locus while changing a distance between adjacent lens units during zooming. The third lens unit L3 has an aperture stop SP. During focusing from infinity to a short distance, the fifth lens unit L5 moves toward the image side, and the sixth lens unit L6 moves toward the image side.

The zoom lens L0 according to Example 2 consists of, in order from the object side to the image side, a first lens unit L1 having positive refractive power, a second lens unit L2 having negative refractive power, a third lens unit L3 having positive refractive power, and the rear group LR. The rear group LR includes a fourth lens unit L4 having positive refractive power, a fifth lens unit L5 having negative refractive power, a sixth lens unit L6 having negative refractive power, a seventh lens unit L7 having positive refractive power, an eighth lens unit L8 having negative refractive power. The first lens unit L1 is fixed relative to the image plane IP during zooming. Each lens unit moves along a different locus while changing a distance between adjacent lens units during zooming. The third lens unit L3 has an aperture stop SP. During focusing from infinity to a short distance, the fifth lens unit L5 moves toward the object side, and the sixth lens unit L6 moves toward the image side.

The zoom lens L0 according to Example 3 consists of, in order from the object side to the image side, a first lens unit L1 having positive refractive power, a second lens unit L2 having negative refractive power, a third lens unit L3 having positive refractive power, and a rear group LR. The rear group LR includes a fourth lens unit L4 having positive refractive power, a fifth lens unit L5 having positive refractive power, a sixth lens unit L6 having negative refractive power, and a seventh lens unit L7 having negative refractive power. The first lens unit L1 is fixed relative to the image plane IP during zooming. Each lens unit moves along a different locus while changing a distance between adjacent lens units during zooming. The third lens unit L3 has an aperture stop SP. During focusing from infinity to a short distance, the fifth lens unit L5 moves toward the object side, and the sixth lens unit L6 moves toward the object side.

The zoom lens L0 according to Example 4 consists of, in order from the object side to the image side, a first lens unit L1 having positive refractive power, a second lens unit L2 having negative refractive power, and a third lens unit L3 having positive refractive power, and a rear group LR. The rear group LR includes a fourth lens unit L4 having positive refractive power, a fifth lens unit L5 having negative refractive power, a sixth lens unit L6 having positive refractive power, and a seventh lens unit L7 having negative refractive power. The first lens unit L1 is fixed relative to the image plane IP during zooming. Each lens unit moves along a different locus while changing a distance between adjacent lens units during zooming. The third lens unit L3 has an aperture stop SP. During focusing from infinity to a short distance, the fifth lens unit L5 moves toward the image side, and the sixth lens unit L6 moves toward the image side.

The zoom lens L0 according to Example 5 consists of, in order from the object side to the image side, a first lens unit L1 having positive refractive power, a second lens unit L2 having negative refractive power, a third lens unit L3 having positive refractive power, and a rear group LR. The rear group LR includes, in order from the object side to the image side, a fourth lens unit L4 having positive refractive power, a fifth lens unit L5 having negative refractive power, and a sixth lens unit L6 having positive refractive power. The first lens unit L1, the third lens unit L3, and the sixth lens unit L6 are fixed relative to the image plane IP during zooming. Each lens unit moves along a different locus while changing a distance between adjacent lens units during zooming. The third lens unit L3 has an aperture stop SP. During focusing from infinity to a short distance, the fifth lens unit L5 moves toward the image side.

The zoom lens L0 according to Example 6 consists of, in order from the object side to the image side, a first lens unit L1 having positive refractive power, a second lens unit L2 having negative refractive power, a third lens unit L3 having positive refractive power, and a rear group LR. The rear group LR includes a fourth lens unit L4 having positive refractive power, a fifth lens unit L5 having negative refractive power, a sixth lens unit L6 having positive refractive power, and a seventh lens unit L7 having negative refractive power. The first lens unit L1 is fixed relative to the image plane IP during zooming. Each lens unit moves along a different locus while changing a distance between adjacent lens units during zooming. The third lens unit L3 has an aperture stop SP. During focusing from infinity to a short distance, the fifth lens unit L5 moves toward the image side, and the sixth lens unit L6 moves toward the image side.

The zoom lens L0 according to Example 7 consists of, in order from the object side to the image side, a first lens unit L1 having positive refractive power, a second lens unit L2 having negative refractive power, a third lens unit L3 having positive refractive power, and a rear group LR. The rear group LR includes, in order from the object side to the image side, a fourth lens unit L4 having negative refractive power, a fifth lens unit L5 having positive refractive power, a sixth lens unit L6 having negative refractive power, a seventh lens unit L7 with having positive refractive power, and an eighth lens unit L8 having negative refractive power. The first lens unit L1 is fixed relative to the image plane IP during zooming. Each lens unit moves along a different locus while changing a distance between adjacent lens units during zooming. The third lens unit L3 has an aperture stop SP. During focusing from infinity to a short distance, the sixth lens unit L6 moves toward the image side, and the seventh lens unit L7 moves toward the image side.

In the zoom lenses L0 according to Examples 1 to 7, all surfaces having refractive power are refractive surfaces. In comparison with a case where a surface having refractive power is formed by a diffractive optical element or a reflective surface, the surface can easily have optical performance equal to or higher than that with the diffractive optical element or the reflective surface, with a lower manufacturing difficulty.

The zoom lenses L0 according to Examples 1 to 7 may perform image stabilization by moving a part of the zoom lens L0 in a direction that has a component orthogonal to the optical axis. If the part moving during the image stabilization is a lens unit that is disposed on the image side and has a relatively small diameter, a driving actuator can be made compact, and the lens apparatus including the zoom lens L0 can be made small. For example, image stabilization may be performed by moving all or part of the third lens unit L3 in a direction that has a component orthogonal to the optical axis.

Numerical examples 1 to 7 corresponding to examples 1 to 5 will be illustrated below.

In surface data of each numerical example, r represents a radius of curvature of each optical surface, and d (mm) is an on-axis distance (distance on the optical axis) between an m-th surface and an (m+1)-th surface, where m is a surface number counted from the light incident side. nd represents a refractive index for the d-line of each optical element, and vd represents an Abbe number of the optical element based on the d-line. The Abbe number vd of a certain material is expressed as follows:

$$vd=(Nd-1)/(NF-NC)$$

where Nd, NF, and NC are refractive indices based on the d-line (587.6 nm), the F-line (486.1 nm), and the C-line (656.3 nm) in the Fraunhofer line, respectively.

In each numerical example, values of d, a focal length (mm), an F-number, and a half angle of view (°) are set in a case where the optical system according to each example is in an in-focus state on an infinity object. A "back focus BF" is a distance on the optical axis from the final lens surface (lens surface closest to the image plane) of the zoom lens L0 to the paraxial image surface expressed in air conversion length. An "overall lens length" of the zoom lens L0 is a length obtained by adding the back focus to a distance on the optical axis from the frontmost lens surface (lens surface closest to the object) to the final lens surface of the zoom lens L0. The "lens unit" includes one or more lenses.

In a case where the optical surface is aspherical, an asterisk * is attached to the right side of the surface number. The aspherical shape is expressed as follows:

$$X=(h^2/R)/[1+\{1-(1+K)(h/R)^2\}^{1/2}]+A4\times h^4+A6\times h^6+A8\times h^8+A10\times h^{10}+A12\times h^{12}$$

where X is a displacement amount from a surface vertex in the optical axis direction, h is a height from the optical axis in a direction orthogonal to the optical axis, a light traveling direction is set positive, R is a paraxial radius of curvature, K is a conic constant, and A4, A6, A8, A10, and A12 are aspheric coefficients. "e±XX" in each aspheric coefficient means "$\times 10^{\pm XX}$."

Numerical Example 1

| UNIT: mm | | | | |
|---|---|---|---|---|
| Surface Data | | | | |
| Surface No. | r | d | nd | vd |
| 1 | −207.425 | 1.70 | 1.83481 | 42.7 |
| 2 | 95.825 | 4.21 | | |
| 3 | 393.916 | 2.00 | 1.72047 | 34.7 |
| 4 | 105.832 | 8.46 | 1.59522 | 67.7 |
| 5 | −203.044 | 0.15 | | |
| 6 | 124.562 | 5.68 | 1.72916 | 54.7 |
| 7 | −487.042 | 0.15 | | |
| 8 | 78.249 | 6.74 | 1.72916 | 54.7 |
| 9 | −444.181 | (Variable) | | |
| 10 | 8601.520 | 1.20 | 1.80400 | 46.5 |
| 11 | 28.416 | 5.54 | | |
| 12 | −738.337 | 1.00 | 1.49700 | 81.5 |
| 13 | 63.533 | 3.06 | | |
| 14 | −115.610 | 1.00 | 1.49700 | 81.5 |
| 15 | 35.816 | 3.84 | 1.90366 | 31.3 |
| 16 | 169.674 | (Variable) | | |
| 17 (SP) | ∞ | 1.00 | | |
| 18 | 67.476 | 3.22 | 1.84666 | 23.8 |
| 19 | −1153.421 | 0.60 | | |
| 20 | 55.893 | 1.20 | 2.00100 | 29.1 |
| 21 | 34.548 | 6.77 | 1.51742 | 52.4 |
| 22 | −82.213 | 3.04 | | |
| 23* | −43.690 | 0.05 | 1.59022 | 30.1 |
| 24 | −46.141 | 1.20 | 1.72916 | 54.7 |
| 25 | 4358.607 | (Variable) | | |
| 26 | 172.999 | 7.58 | 1.49700 | 81.5 |
| 27 | −27.250 | 1.19 | 1.83400 | 37.2 |
| 28 | 231.097 | 0.15 | | |
| 29 | 48.103 | 7.69 | 1.48749 | 70.2 |
| 30 | −81.882 | 0.15 | | |
| 31 | 42.435 | 9.37 | 1.43875 | 94.7 |
| 32 | −82.878 | 0.15 | | |
| 33* | 78.425 | 2.40 | 1.85400 | 40.4 |
| 34 | 37.200 | 9.41 | 1.61800 | 63.4 |
| 35 | −70.814 | (Variable) | | |
| 36 | 161.341 | 1.20 | 1.77250 | 49.6 |
| 37 | 28.989 | (Variable) | | |
| 38* | 48.348 | 3.91 | 1.58313 | 59.4 |
| 39 | 95.150 | (Variable) | | |
| 40 | 224.141 | 7.07 | 1.80810 | 22.8 |
| 41 | −35.894 | 1.50 | 1.49700 | 81.5 |
| 42 | 361.709 | 7.03 | | |
| 43 | −34.951 | 1.50 | 1.92286 | 20.9 |
| 44 | −125.011 | (Variable) | | |
| Image Plane | ∞ | | | |

Aspheric Data

23rd Surface

K = 0.00000e+00 A 4 = 3.79285e−06 A 6 = −1.22591e−10 A 8 = 5.46760e−13

33rd Surface

K = 0.00000e+00 A 4 = −7.34648e−06 A 6 = −3.52185e−09 A 8 = 3.20919e−13

38th Surface

K = 0.00000e+00 A 4 = 1.44392e−06 A 6 = 4.53989e−09 A 8 = −1.13675e−13
A10 = −4.07591e−15

VARIOUS DATA

| Zoom Ratio | | 4.12 | |
|---|---|---|---|
| | WIDE | MIDDLE | TELE |
| Focal Length | 24.72 | 50.19 | 101.86 |
| Fno | 2.90 | 2.90 | 2.90 |
| Half Angle of View (°) | 41.19 | 23.32 | 11.99 |
| Overall Lens Length | 212.40 | 212.40 | 212.40 |
| BF | 11.98 | 26.45 | 21.74 |
| d 9 | 0.80 | 16.04 | 34.02 |
| d16 | 41.01 | 21.11 | 2.98 |

-continued

| UNIT: mm | | | |
|---|---|---|---|
| d25 | 19.68 | 9.87 | 0.79 |
| d35 | 2.80 | 1.19 | 1.18 |
| d37 | 7.64 | 6.92 | 6.23 |
| d39 | 6.39 | 8.72 | 23.36 |
| d44 | 11.98 | 26.45 | 21.74 |

| ZOOM LENS UNIT DATA | | |
|---|---|---|
| Lens Unit | Starting Surface | Focal Length |
| 1 | 1 | 83.05 |
| 2 | 10 | −27.72 |
| 3 | 17 | 106.51 |
| 4 | 26 | 34.04 |
| 5 | 36 | −45.93 |
| 6 | 38 | 163.53 |
| 7 | 40 | −161.55 |

Numerical Example 2

| UNIT: mm | | | |
|---|---|---|---|
| Surface Data | | | |
| Surface No. | r | d | nd | vd |
| 1 | −208.117 | 2.00 | 2.00100 | 29.1 |
| 2 | 125.012 | 1.73 | | |
| 3 | 201.666 | 6.72 | 1.59522 | 67.7 |
| 4 | −188.208 | 0.13 | | |
| 5 | 120.220 | 5.48 | 1.83481 | 42.7 |
| 6 | −1189.696 | 0.15 | | |
| 7 | 69.551 | 5.71 | 1.83481 | 42.7 |
| 8 | 436.182 | (Variable) | | |
| 9 | 214.024 | 1.20 | 1.90043 | 37.4 |
| 10 | 26.866 | 6.02 | | |
| 11 | −282.246 | 1.20 | 1.59522 | 67.7 |
| 12 | 48.782 | 4.24 | | |
| 13 | −64.715 | 1.20 | 1.49700 | 81.5 |
| 14 | 39.804 | 4.37 | 1.85025 | 30.1 |
| 15 | −376.767 | (Variable) | | |
| 16 (SP) | ∞ | 1.00 | | |
| 17 | 76.845 | 3.20 | 1.84666 | 23.8 |
| 18 | −332.575 | 0.50 | | |
| 19 | 56.009 | 0.90 | 2.00100 | 29.1 |
| 20 | 34.921 | 6.63 | 1.51742 | 52.4 |
| 21 | −82.324 | 3.17 | | |
| 22* | −40.899 | 0.05 | 1.59022 | 30.1 |
| 23 | −43.512 | 1.20 | 1.72916 | 54.7 |
| 24 | −438.046 | (Variable) | | |
| 25 | 107.656 | 9.03 | 1.49700 | 81.5 |
| 26 | −23.891 | 1.19 | 1.95375 | 32.3 |
| 27 | −1561.807 | 0.15 | | |
| 28 | 57.153 | 9.76 | 1.43875 | 94.7 |
| 29 | −41.965 | 0.15 | | |
| 30* | 84.677 | 7.95 | 1.80400 | 46.5 |
| 31* | −52.890 | (Variable) | | |
| 32 | 185.555 | 2.58 | 1.89286 | 20.4 |
| 33 | −333.256 | 1.20 | 1.61800 | 63.4 |
| 34 | 46.156 | (Variable) | | |
| 35 | 77.039 | 1.20 | 2.00100 | 29.1 |
| 36 | 30.744 | (Variable) | | |
| 37* | 37.408 | 4.07 | 1.58313 | 59.4 |
| 38* | 53.618 | 0.13 | | |
| 39 | 47.870 | 1.39 | 2.00069 | 25.5 |
| 40 | 25.731 | 9.31 | 1.61800 | 63.4 |
| 41 | 176.934 | (Variable) | | |
| 42 | 54.577 | 7.41 | 1.84666 | 23.8 |
| 43 | −80.249 | 1.50 | 1.48749 | 70.2 |
| 44 | 42.160 | 7.49 | | |

-continued

UNIT: mm

| | | | | |
|---|---|---|---|---|
| 45 | −49.214 | 1.50 | 1.92286 | 20.9 |
| 46 | −97.002 | (Variable) | | |
| Image Plane | ∞ | | | |

Aspheric Data

22nd Surface

K = 0.00000e+00 A 4 = 4.39269e−06 A 6 = 1.10097e−09 A 8 = 6.31456e−13
30th Surface K = 0.00000e+00 A 4 = −5.80494e−06 A 6 = −2.08319e−09 A 8 = −2.99833e−12
31st Surface K = 0.00000e+00 A 4 = 1.13763e−06 A 6 = −3.28114e−09
37th Surface K = 0.00000e+00 A 4 = −2.38842e−06 A 6 = −2.70374e−09 A 8 = −1.84658e−11
A10 = 2.89507e−14
38th Surface K = 0.00000e+00 A 4 = 6.75134e−08 A 6 = −3.59874e−09 A 8 = −2.39776e−11
A10 = 3.36099e−14

VARIOUS DATA

| Zoom Ratio | | 4.13 | |
|---|---|---|---|
| | WIDE | MIDDLE | TELE |
| Focal Length | 24.73 | 50.23 | 102.12 |
| Fno | 2.90 | 2.90 | 2.90 |
| Half Angle of View (°) | 41.19 | 23.30 | 11.96 |
| Overall Lens Length | 211.51 | 211.51 | 211.51 |
| BF | 11.80 | 26.61 | 26.29 |
| d 8 | 0.80 | 15.28 | 30.36 |
| d15 | 39.32 | 19.23 | 2.99 |
| d24 | 19.57 | 9.93 | 0.78 |
| d31 | 4.00 | 1.22 | 2.88 |
| d34 | 4.47 | 7.50 | 6.25 |
| d36 | 7.75 | 7.49 | 7.08 |
| d41 | 1.00 | 1.44 | 12.05 |
| d46 | 11.80 | 26.61 | 26.29 |

ZOOM LENS UNIT DATA

| Lens Unit | Starting Surface | Focal Length |
|---|---|---|
| 1 | 1 | 79.54 |
| 2 | 9 | −24.54 |
| 3 | 16 | 97.60 |
| 4 | 25 | 34.35 |
| 5 | 32 | −131.33 |
| 6 | 35 | −51.78 |
| 7 | 37 | 123.01 |
| 8 | 42 | 770.84 |

Numerical Example 3

UNIT: mm

Surface Data

| Surface No. | r | d | nd | vd |
|---|---|---|---|---|
| 1 | −181.919 | 1.70 | 1.90043 | 37.4 |
| 2 | 111.072 | 3.71 | | |
| 3 | 364.499 | 5.59 | 1.59522 | 67.7 |
| 4 | −177.536 | 0.14 | | |
| 5 | 154.743 | 4.78 | 1.75500 | 52.3 |
| 6 | −870.763 | 0.15 | | |
| 7 | 84.502 | 7.28 | 1.75500 | 52.3 |
| 8 | −367.735 | (Variable) | | |

-continued

| UNIT: mm | | | | |
|---|---|---|---|---|
| 9 | −2513.905 | 1.30 | 1.72916 | 54.7 |
| 10 | 27.941 | 6.20 | | |
| 11 | −452.183 | 1.20 | 1.59522 | 67.7 |
| 12 | 68.302 | 2.86 | | |
| 13 | −147.630 | 1.20 | 1.49700 | 81.5 |
| 14 | 37.027 | 4.02 | 1.90043 | 37.4 |
| 15 | 197.666 | (Variable) | | |
| 16 (SP) | ∞ | 1.00 | | |
| 17 | 70.360 | 3.19 | 1.84666 | 23.8 |
| 18 | −1084.899 | 0.60 | | |
| 19 | 62.970 | 1.20 | 2.05090 | 26.9 |
| 20 | 36.953 | 6.53 | 1.56732 | 42.8 |
| 21 | −87.660 | 3.17 | | |
| 22* | −43.587 | 0.05 | 1.59022 | 30.1 |
| 23 | −46.864 | 1.40 | 1.77250 | 49.6 |
| 24 | 3434.700 | (Variable) | | |
| 25 | 68.421 | 7.75 | 1.49700 | 81.5 |
| 26 | −34.337 | 1.19 | 1.83400 | 37.2 |
| 27 | 94.819 | 0.15 | | |
| 28 | 45.071 | 5.49 | 1.49700 | 81.5 |
| 29 | 1775.190 | 0.15 | | |
| 30 | 38.956 | 9.94 | 1.49700 | 81.5 |
| 31 | −94.914 | 2.39 | | |
| 32* | 78.620 | 2.50 | 1.85400 | 40.4 |
| 33* | 49.978 | (Variable) | | |
| 34* | 37.006 | 8.81 | 1.58313 | 59.4 |
| 35* | −88.576 | (Variable) | | |
| 36 | 123.459 | 1.20 | 2.00100 | 29.1 |
| 37 | 40.182 | (Variable) | | |
| 38 | 73.297 | 8.72 | 1.84666 | 23.8 |
| 39 | −41.340 | 1.40 | 1.60311 | 60.6 |
| 40 | 49.128 | 8.20 | | |
| 41 | −33.125 | 1.40 | 1.92286 | 20.9 |
| 42 | −59.144 | (Variable) | | |
| Image Plane | ∞ | | | |

| Aspheric Data |
|---|
| 22nd Surface |

$K = 0.00000e+00$ $A4 = 3.89058e-06$ $A6 = 6.70856e-10$ $A8 = -1.58188e-12$

32nd Surface $K = 0.00000e+00$ $A4 = 4.26123e-06$ $A6 = -9.76054e-09$ $A8 = -4.97564e-12$ 33rd Surface $K = 0.00000e+00$ $A4 = 1.08509e-05$ $A6 = -5.04108e-09$ $A8 = -2.02185e-12$
$A10 = 5.27144e-15$ 34th Surface $K = 0.00000e+00$ $A4 = -1.80819e-06$ $A6 = -1.87700e-09$ $A8 = 3.87938e-13$ 35th Surface $K = 0.00000e+00$ $A4 = 4.45032e-06$ $A6 = -4.27576e-09$ $A8 = 3.65399e-12$

| VARIOUS DATA | | | |
|---|---|---|---|
| Zoom Ratio | | 4.12 | |
| | WIDE | MIDDLE | TELE |
| Focal Length | 24.72 | 50.22 | 101.96 |
| Fno | 2.90 | 2.90 | 2.90 |
| Half Angle of View (°) | 41.19 | 23.31 | 11.98 |
| Overall Lens Length | 211.02 | 211.02 | 211.02 |
| BF | 11.85 | 26.68 | 22.74 |
| d 8 | 0.80 | 16.99 | 35.41 |
| d15 | 44.29 | 21.72 | 3.00 |
| d24 | 20.71 | 11.73 | 0.78 |
| d33 | 4.43 | 7.45 | 8.57 |
| d35 | 2.11 | 1.69 | 3.52 |
| d37 | 10.27 | 8.21 | 20.44 |
| d42 | 11.85 | 26.68 | 22.74 |

-continued

| UNIT: mm | | |
|---|---|---|
| ZOOM LENS UNIT DATA | | |
| Lens Unit | Starting Surface | Focal Length |
| 1 | 1 | 94.31 |
| 2 | 9 | −29.02 |
| 3 | 16 | 127.17 |
| 4 | 25 | 83.32 |
| 5 | 34 | 45.95 |
| 6 | 36 | −59.94 |
| 7 | 38 | −203.31 |

Numerical Example 4

| UNIT: mm | | | | |
|---|---|---|---|---|
| Surface Data | | | | |
| Surface No. | r | d | nd | vd |
| 1 | −266.746 | 1.60 | 1.90043 | 37.4 |
| 2 | 98.340 | 2.81 | | |
| 3 | 192.058 | 6.58 | 1.53775 | 74.7 |
| 4 | −241.263 | 0.15 | | |
| 5 | 119.575 | 5.31 | 1.72916 | 54.7 |
| 6 | −1682.093 | 0.15 | | |
| 7 | 76.157 | 6.72 | 1.72916 | 54.7 |
| 8 | −880.300 | (Variable) | | |
| 9 | 915.083 | 1.20 | 1.88300 | 40.8 |
| 10 | 29.841 | 5.73 | | |
| 11 | −218.330 | 1.00 | 1.59522 | 67.7 |
| 12 | 63.389 | 3.69 | | |
| 13 | −74.215 | 1.10 | 1.49700 | 81.5 |
| 14 | 41.057 | 4.98 | 1.77047 | 29.7 |
| 15 | −204.631 | (Variable) | | |
| 16 (SP) | ∞ | 1.00 | | |
| 17 | 78.578 | 3.15 | 1.84666 | 23.8 |
| 18 | −594.031 | 0.60 | | |
| 19 | 59.615 | 1.20 | 2.00100 | 29.1 |
| 20 | 36.734 | 7.47 | 1.51742 | 52.4 |
| 21 | −83.322 | 3.11 | | |
| 22* | −44.261 | 0.05 | 1.59022 | 30.1 |
| 23 | −47.091 | 1.20 | 1.77250 | 49.6 |
| 24 | −640.625 | (Variable) | | |
| 25 | 255.634 | 8.10 | 1.49700 | 81.5 |
| 26 | −27.474 | 1.30 | 1.90043 | 37.4 |
| 27 | −222.061 | 0.15 | | |
| 28 | 41.537 | 8.18 | 1.49700 | 81.5 |
| 29 | −105.932 | 2.30 | | |
| 30 | 63.231 | 6.49 | 1.49700 | 81.5 |
| 31 | −97.379 | 0.15 | | |
| 32* | 85.354 | 2.40 | 1.85400 | 40.4 |
| 33 | 34.925 | 8.89 | 1.60311 | 60.6 |
| 34 | −78.017 | (Variable) | | |
| 35 | 157.315 | 1.20 | 1.72916 | 54.7 |
| 36 | 28.256 | (Variable) | | |
| 37* | 47.159 | 4.54 | 1.58313 | 59.4 |
| 38 | 160.935 | (Variable) | | |
| 39 | 210.344 | 5.69 | 1.80518 | 25.4 |
| 40 | −46.896 | 1.50 | 1.48749 | 70.2 |
| 41 | 59.110 | 9.57 | | |
| 42 | −33.883 | 1.20 | 2.00069 | 25.5 |
| 43 | −66.006 | (Variable) | | |
| Image Plane | ∞ | | | |

| Aspheric Data |
|---|
| 22nd Surface |

K = 0.00000e+00 A 4 = 3.72124e−06 A 6 = 3.39835e−10 A 8 = 6.96887e−13

32nd Surface

K = 0.00000e+00 A 4 = −7.10364e−06 A 6 = −3.27713e−09 A 8 = −1.38031e−12

-continued

| UNIT: mm |
|---|

37th Surface

K = 0.00000e+00 A 4 = 1.68172e−06 A 6 = 3.21879e−09 A 8 = 5.86323e−12
A10 = −1.26470e−14

VARIOUS DATA

| Zoom Ratio | | 4.12 | |
|---|---|---|---|
| | WIDE | MIDDLE | TELE |
| Focal Length | 24.78 | 50.31 | 102.06 |
| Fno | 2.90 | 2.90 | 2.90 |
| Half Angle of View (°) | 41.12 | 23.27 | 11.97 |
| Overall Lens Length | 211.98 | 211.98 | 211.98 |
| BF | 11.63 | 25.76 | 19.01 |
| d 8 | 0.80 | 16.58 | 34.70 |
| d15 | 42.76 | 21.90 | 2.98 |
| d24 | 19.63 | 10.61 | 0.79 |
| d34 | 2.50 | 1.78 | 1.10 |
| d36 | 8.07 | 7.90 | 7.19 |
| d38 | 6.12 | 7.00 | 25.75 |
| d43 | 11.63 | 25.76 | 19.01 |

ZOOM LENS UNIT DATA

| Lens Unit | Starting Surface | Focal Length |
|---|---|---|
| 1 | 1 | 90.57 |
| 2 | 9 | −27.00 |
| 3 | 16 | 119.23 |
| 4 | 25 | 35.02 |
| 5 | 35 | −47.42 |
| 6 | 37 | 112.74 |
| 7 | 39 | −90.78 |

Numerical Example 5

| UNIT: mm | | | |
|---|---|---|---|
| Surface Data | | | |
| Surface No. | r | d | nd | vd |
|---|---|---|---|---|
| 1 | −389.691 | 1.40 | 1.90366 | 31.3 |
| 2 | 82.287 | 1.23 | | |
| 3 | 110.994 | 6.05 | 1.65160 | 58.5 |
| 4 | −281.308 | 0.15 | | |
| 5 | 85.673 | 4.31 | 1.65160 | 58.5 |
| 6 | 806.235 | 0.15 | | |
| 7 | 54.903 | 5.58 | 1.65160 | 58.5 |
| 8 | 785.992 | (Variable) | | |
| 9 | 276.074 | 0.90 | 1.88300 | 40.8 |
| 10 | 20.141 | 4.07 | | |
| 11 | −100.883 | 0.80 | 1.53775 | 74.7 |
| 12 | 49.869 | 3.05 | | |
| 13 | −28.690 | 0.80 | 1.49700 | 81.5 |
| 14 | 73.099 | 3.05 | | |
| 15 | 69.513 | 2.56 | 1.78880 | 28.4 |
| 16 | −73.855 | (Variable) | | |
| 17 (SP) | ∞ | 1.00 | | |
| 18 | 66.752 | 2.49 | 1.84666 | 23.8 |
| 19 | −170.746 | 0.60 | | |
| 20 | 52.894 | 1.00 | 1.90043 | 37.4 |
| 21 | 29.273 | 4.92 | 1.49700 | 81.5 |
| 22 | −70.437 | 2.67 | | |
| 23* | −36.877 | 0.05 | 1.59022 | 30.1 |
| 24 | −37.750 | 0.80 | 2.00100 | 29.1 |
| 25 | −159.049 | (Variable) | | |
| 26 | 18.192 | 6.90 | 1.49700 | 81.5 |
| 27 | −122.358 | 1.85 | | |
| 28* | 34.893 | 2.00 | 1.85400 | 40.4 |
| 29 | 12.704 | 8.70 | 1.53775 | 74.7 |

| UNIT: mm | | | | |
|---|---|---|---|---|
| 30 | −41.343 | (Variable) | | |
| 31 | 201.365 | 0.80 | 1.69680 | 55.5 |
| 32 | 16.529 | 3.19 | | |
| 33* | 33.474 | 0.05 | 1.59022 | 30.1 |
| 34 | 29.970 | 2.61 | 1.69895 | 30.1 |
| 35 | 91.279 | (Variable) | | |
| 36 | −7374.962 | 0.99 | 1.84666 | 23.8 |
| 37 | 18.843 | 8.00 | 1.95375 | 32.3 |
| 38 | −532.203 | (Variable) | | |
| Image Plane | ∞ | | | |

Aspheric Data

23rd Surface

K = 0.00000e+00 A 4 = 2.89420e−06 A 6 = −1.34568e−08 A 8 = 6.36985e−11

28th Surface

K = 0.00000e+00 A 4 = −2.64372e−05 A 6 = −4.41245e−08 A 8 = −1.20269e−10

33rd Surface

K = 0.00000e+00 A 4 = 9.94261e−06 A 6 = 5.34360e−08 A 8 = 4.64696e−10
A10 = −1.17368e−12

VARIOUS DATA

| Zoom Ratio | | 3.77 | |
|---|---|---|---|
| | WIDE | MIDDLE | TELE |
| Focal Length | 15.45 | 29.99 | 58.20 |
| Fno | 2.90 | 2.90 | 2.90 |
| Half Angle of View (°) | 41.5 | 24.4 | 13.2 |
| Overall Lens Length | 144.55 | 144.55 | 144.55 |
| BF | 13.62 | 13.62 | 13.62 |
| d 8 | 0.80 | 12.60 | 26.36 |
| d16 | 28.06 | 16.26 | 2.50 |
| d25 | 14.40 | 3.69 | 0.79 |
| d30 | 2.47 | 1.67 | 6.03 |
| d35 | 2.46 | 13.97 | 12.50 |
| d38 | 13.62 | 13.62 | 13.62 |

ZOOM LENS UNIT DATA

| Lens Unit | Starting Surface | Focal Length |
|---|---|---|
| 1 | 1 | 73.07 |
| 2 | 9 | −18.38 |
| 3 | 17 | 95.63 |
| 4 | 26 | 25.34 |
| 5 | 31 | −42.47 |
| 6 | 36 | 136.61 |

Numerical Example 6

| UNIT: mm | | | | |
|---|---|---|---|---|
| Surface Data | | | | |
| Surface No. | r | d | nd | vd |
| 1 | −145.889 | 1.50 | 1.80400 | 46.5 |
| 2 | 119.213 | 2.83 | | |
| 3 | 253.040 | 1.80 | 1.90043 | 37.4 |
| 4 | 99.211 | 10.81 | 1.59522 | 67.7 |
| 5 | −178.530 | 0.15 | | |
| 6 | 173.080 | 5.74 | 1.72916 | 54.7 |
| 7 | −394.348 | 2.00 | 2.00069 | 25.5 |
| 8 | −422.661 | 0.15 | | |
| 9 | 95.066 | 7.91 | 1.72916 | 54.7 |
| 10 | −254.672 | (Variable) | | |
| 11 | 32331.499 | 1.20 | 1.80400 | 46.5 |
| 12 | 30.515 | 6.54 | | |

-continued

| UNIT: mm | | | | |
|---|---|---|---|---|
| 13 | −299.616 | 1.00 | 1.53775 | 74.7 |
| 14 | 90.027 | 2.78 | | |
| 15 | −141.186 | 1.00 | 1.43875 | 94.7 |
| 16 | 39.551 | 4.13 | 1.85025 | 30.1 |
| 17 | 177.556 | (Variable) | | |
| 18 (SP) | ∞ | 1.00 | | |
| 19 | 68.706 | 3.23 | 1.84666 | 23.8 |
| 20 | 644.861 | 0.60 | | |
| 21 | 57.756 | 1.20 | 2.00100 | 29.1 |
| 22 | 35.487 | 8.08 | 1.51742 | 52.4 |
| 23 | −76.532 | 3.14 | | |
| 24* | −44.193 | 0.05 | 1.59022 | 30.1 |
| 25 | −46.651 | 1.20 | 1.61800 | 63.4 |
| 26 | 629.006 | (Variable) | | |
| 27 | 388.004 | 8.23 | 1.49700 | 81.5 |
| 28 | −28.092 | 1.19 | 1.83400 | 37.2 |
| 29 | −820.088 | 0.15 | | |
| 30 | 47.740 | 7.55 | 1.49700 | 81.5 |
| 31 | −108.833 | 0.15 | | |
| 32 | 44.919 | 10.21 | 1.43875 | 94.7 |
| 33 | −90.770 | 0.16 | | |
| 34* | 93.341 | 2.40 | 1.85400 | 40.4 |
| 35 | 38.885 | 9.13 | 1.61800 | 63.4 |
| 36 | −68.796 | (Variable) | | |
| 37 | 164.339 | 1.20 | 1.77250 | 49.6 |
| 38 | 28.327 | (Variable) | | |
| 39* | 41.956 | 3.18 | 1.58913 | 61.1 |
| 40 | 55.503 | (Variable) | | |
| 41 | 162.671 | 7.26 | 1.80810 | 22.8 |
| 42 | −34.956 | 1.50 | 1.49700 | 81.5 |
| 43 | 174.387 | 6.54 | | |
| 44 | −35.777 | 1.50 | 1.92286 | 20.9 |
| 45 | −106.777 | (Variable) | | |
| Image Plane | ∞ | | | |

| Aspheric Data |
|---|
| 24th Surface |

K = 0.00000e+00 A 4 = 3.02503e−06 A 6 = 3.04230e−10 A 8 = 3.19935e−13

| 34th Surface |
|---|

K = 0.00000e+00 A 4 = −7.45028e−06 A 6 = −3.06797e−09 A 8 = 1.75070e−12

| 39th Surface |
|---|

K = 0.00000e+00 A 4 = 1.28377e−06 A 6 = 3.88604e−09 A 8 = −1.88119e−13
A10 = −6.12251e−15

| VARIOUS DATA | | | |
|---|---|---|---|
| Zoom Ratio | | 4.71 | |
| | WIDE | MIDDLE | TELE |
| Focal Length | 24.71 | 53.66 | 116.38 |
| Fno | 2.90 | 2.90 | 2.90 |
| Half Angle of View (°) | 41.3 | 22.0 | 10.0 |
| Overall Lens Length | 231.23 | 231.23 | 231.23 |
| BF | 11.38 | 27.62 | 23.01 |
| d10 | 0.80 | 20.19 | 40.99 |
| d17 | 50.25 | 24.76 | 2.98 |
| d26 | 22.69 | 12.57 | 1.36 |
| d36 | 2.84 | 1.19 | 1.19 |
| d38 | 8.70 | 6.18 | 3.68 |
| d40 | 6.18 | 10.33 | 29.64 |
| d45 | 11.38 | 27.62 | 23.01 |

| ZOOM LENS UNIT DATA | | |
|---|---|---|
| Lens Unit | Starting Surface | Focal Length |
| 1 | 1 | 94.53 |
| 2 | 11 | −30.84 |
| 3 | 18 | 115.09 |
| 4 | 27 | 34.67 |

-continued

| UNIT: mm | | |
|---|---|---|
| 5 | 37 | −44.48 |
| 6 | 39 | 268.40 |
| 7 | 41 | −230.97 |

Numerical Example 7

| UNIT: mm | | | | |
|---|---|---|---|---|
| Surface Data | | | | |
| Surface No. | r | d | nd | vd |
| 1 | −110.000 | 1.50 | 1.81600 | 46.6 |
| 2 | 110.000 | 3.07 | | |
| 3 | 493.334 | 1.80 | 1.80400 | 46.5 |
| 4 | 70.906 | 9.80 | 1.59522 | 67.7 |
| 5 | −169.964 | 0.15 | | |
| 6 | 196.640 | 4.95 | 1.72916 | 54.7 |
| 7 | −211.777 | 0.15 | | |
| 8 | 79.760 | 7.13 | 1.72916 | 54.7 |
| 9 | −184.077 | (Variable) | | |
| 10 | 354.643 | 1.20 | 1.88300 | 40.8 |
| 11 | 27.676 | 4.91 | | |
| 12 | 2967.414 | 1.00 | 1.53775 | 74.7 |
| 13 | 53.350 | 3.57 | | |
| 14 | −80.750 | 1.00 | 1.43875 | 94.7 |
| 15 | 37.143 | 3.88 | 1.85025 | 30.1 |
| 16 | 344.923 | (Variable) | | |
| 17 (SP) | ∞ | 1.00 | | |
| 18 | 72.562 | 2.66 | 1.84666 | 23.9 |
| 19 | 372.885 | 0.60 | | |
| 20 | 57.431 | 1.20 | 1.95375 | 32.3 |
| 21 | 35.760 | 7.09 | 1.51742 | 52.4 |
| 22 | −85.235 | (Variable) | | |
| 23* | −43.596 | 0.05 | 1.59022 | 30.1 |
| 24 | −46.839 | 1.20 | 1.61800 | 63.4 |
| 25 | −190.441 | (Variable) | | |
| 26 | 239.146 | 8.65 | 1.49700 | 81.5 |
| 27 | −25.927 | 1.19 | 1.85150 | 40.8 |
| 28 | −4745.541 | 0.15 | | |
| 29 | 49.220 | 8.85 | 1.49700 | 81.5 |
| 30 | −81.928 | 0.15 | | |
| 31 | 43.459 | 9.11 | 1.43875 | 94.7 |
| 32 | −90.430 | 1.06 | | |
| 33* | 93.586 | 2.40 | 1.85400 | 40.4 |
| 34 | 39.080 | 9.51 | 1.61800 | 63.4 |
| 35 | −59.538 | (Variable) | | |
| 36 | 162.663 | 1.20 | 1.77250 | 49.6 |
| 37 | 26.850 | (Variable) | | |
| 38* | 44.357 | 3.99 | 1.58913 | 61.1 |
| 39 | 66.856 | (Variable) | | |
| 40 | 243.719 | 8.35 | 1.80810 | 22.8 |
| 41 | −33.555 | 1.50 | 1.49700 | 81.5 |
| 42 | 466.937 | 4.35 | | |
| 43 | −38.492 | 1.50 | 1.92286 | 20.9 |
| 44 | −130.591 | (Variable) | | |
| Image Plane | ∞ | | | |

Aspheric Data

23rd Surface

K = 0.00000e+00 A 4 = 3.09065e−06 A 6 = 8.9734le−10 A 8 = 3.15334e−13

33rd Surface

K = 0.00000e+00 A 4 = −8.20701e−06 A 6 = −3.56263e−09 A 8 = 1.99134e−12

38th Surface

K = 0.00000e+00 A 4 = 1.50567e−06 A 6 = 6.57547e−09 A 8 = −6.15310e−12
A10 = 5.36338e−15

-continued

| UNIT: mm | | | |
|---|---|---|---|
| VARIOUS DATA | | | |
| Zoom Ratio | | 3.67 | |
| | WIDE | MIDDLE | TELE |
| Focal Length | 22.60 | 43.42 | 82.99 |
| Fno | 2.90 | 2.90 | 2.90 |
| Half Angle of View (°) | 44.3 | 26.5 | 14.1 |
| Overall Lens Length | 216.25 | 216.25 | 216.25 |
| BF | 11.83 | 26.43 | 22.33 |
| d 9 | 0.80 | 14.07 | 30.07 |
| d16 | 40.40 | 19.90 | 3.00 |
| d22 | 3.25 | 5.48 | 5.28 |
| d25 | 22.69 | 12.25 | 0.80 |
| d35 | 2.50 | 1.19 | 2.40 |
| d37 | 10.60 | 8.52 | 5.72 |
| d39 | 4.31 | 8.53 | 26.79 |
| d44 | 11.83 | 26.43 | 22.33 |

| ZOOM LENS UNIT DATA | | |
|---|---|---|
| Lens Unit | Starting Surface | Focal Length |
| 1 | 1 | 85.62 |
| 2 | 10 | −27.33 |
| 3 | 17 | 51.61 |
| 4 | 23 | −92.16 |
| 5 | 26 | 33.47 |
| 6 | 36 | −41.79 |
| 7 | 38 | 209.93 |
| 8 | 40 | −242.13 |

Table 1 below summarizes various values in each numerical example.

TABLE 1

| | Ex. 1 | Ex. 2 | Ex. 3 | Ex. 4 | Ex. 5 | Ex. 6 | Ex. 7 |
|---|---|---|---|---|---|---|---|
| (r112 + r111)/(r112 − r111) | −0.368 | −0.249 | −0.242 | −0.461 | −0.651 | −0.101 | 0.000 |
| f1/(−f2) | 2.996 | 3.241 | 3.249 | 3.355 | 3.975 | 3.065 | 3.133 |
| f11/f1 | 0.943 | 0.978 | 0.810 | 0.879 | 1.027 | 0.861 | 0.785 |
| T1/f1 | 0.350 | 0.276 | 0.248 | 0.257 | 0.258 | 0.348 | 0.334 |
| −f2/fw | 1.121 | 0.993 | 1.174 | 1.089 | 1.190 | 1.248 | 1.209 |
| f3/fw | 4.308 | 3.947 | 5.145 | 4.811 | 6.189 | 4.657 | 2.283 |
| BFw/fw | 0.485 | 0.477 | 0.479 | 0.469 | 0.881 | 0.461 | 0.523 |
| D12t/fw | 1.376 | 1.228 | 1.432 | 1.400 | 1.706 | 1.658 | 1.330 |
| f21/f2 | 1.279 | 1.395 | 1.305 | 1.295 | 1.341 | 1.232 | 1.246 |
| β2t | −0.990 | −0.996 | −0.852 | −0.853 | −0.670 | −0.984 | −0.672 |
| T11/fw | 0.069 | 0.081 | 0.069 | 0.065 | 0.091 | 0.061 | 0.066 |
| D112/fw | 0.170 | 0.070 | 0.150 | 0.113 | 0.079 | 0.114 | 0.136 |

Image Pickup Apparatus

Figure 15:
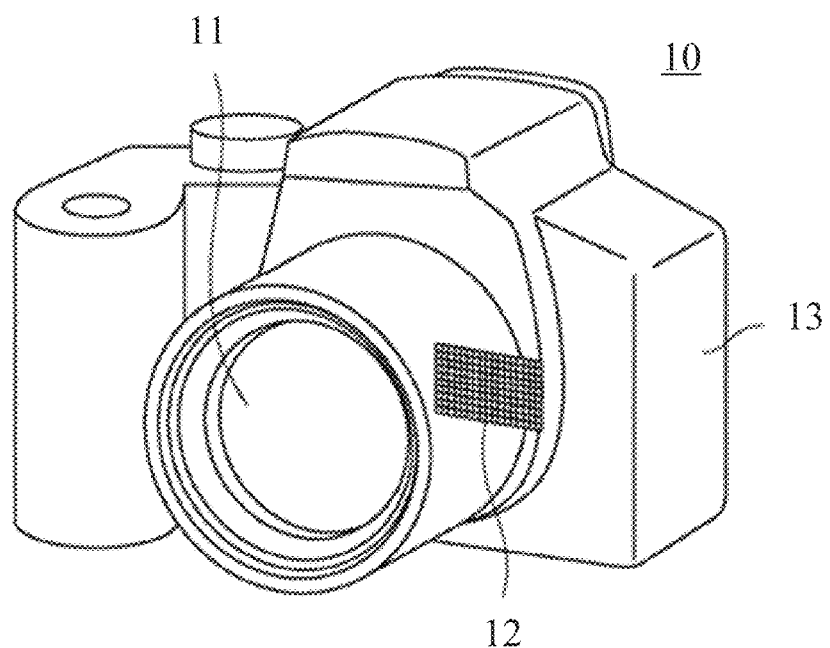
FIG. 15 is a schematic diagram of an image pickup apparatus.

Referring now to FIG. 15, a description will be given of a digital still camera (image pickup apparatus) using the zoom lens L0 according to each example as an imaging optical system. FIG. 15 illustrates a configuration of an image pickup apparatus 10. The image pickup apparatus 10 includes a camera body 13, an imaging optical system (lens apparatus) 11 including the zoom lens L0 according to any one of Examples 1 to 7, and an image sensor (light receiving element) 12 configured to photoelectrically convert an image formed by the zoom lens L0. The image sensor 12 can use a CCD sensor or a CMOS sensor. The lens apparatus 11 and the camera body 13 may be integrated with each other, or may be detachably configured. The camera body 13 may be a so-called single lens reflex camera having a quick turn mirror, or a so-called mirrorless camera without a quick turn mirror. The image pickup apparatus 10 according to this example can be small and lightweight, and have high optical performance.

The image pickup apparatus 10 according to this example is not limited to the digital still camera illustrated in FIG. 15, but is applicable to various image pickup apparatuses such as a broadcasting camera, a film-based camera, a surveillance camera, and the like.

Image Pickup System

An image pickup system (surveillance camera system) may include the zoom lens according to any one of the above examples and a control unit configured to control the zoom lens. In this case, the control unit is configured to control the zoom lens so that each lens unit moves as described above during zooming, focusing, and image stabilization. The control unit does not have to be integrated with the zoom lens, and may be separate from the zoom lens. For example, a control unit (control apparatus) disposed remotely from a driving unit configured to drive each lens in the zoom lens may include a transmission unit configured to transmit a control signal (command) for controlling the zoom lens. This control unit can remotely control the zoom lens.

By providing an operation unit such as a controller and buttons for remotely operating the zoom lens to the control unit, the zoom lens may be controlled according to the user's input to the operation unit. For example, the operation unit may include an enlargement button and a reduction button. A signal may be sent from the control unit to the driving unit of the zoom lens L0 so that in a case where the user presses the enlargement button, the magnification of the zoom lens increases, and in a case where the user presses the reduction button, the magnification of the zoom lens decreases.

The image pickup system may include a display unit such as a liquid crystal panel configured to display information (moving state) about the zoom of the zoom lens. The information about the zoom of the zoom lens is, for example, the zoom magnification (zoom state) and a moving amount (moving state) of each lens unit. In this case, the user can remotely operate the zoom lens through the operation unit while viewing information about the zoom of the zoom lens displayed on the display unit. The display unit and the operation unit may be integrated by adopting a touch panel or the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a zoom lens that has a high magnification ratio, a large aperture ratio, a compact size, reduced weight, high image quality, and high-speed zoom operation ability.

This application claims the benefit of Japanese Patent Application No. 2022-192641, filed on Dec. 1, 2022, which is hereby incorporated by reference herein in its entirety.

What is claimed is:

1. A zoom lens comprising a plurality of lens units, the plurality of lens units consisting of, in order from an object side to an image side, a first lens unit having positive refractive power, a second lens unit having negative refractive power, a third lens unit having positive refractive power, and a rear group including two or more lens units,
wherein a distance between adjacent lens units changes during zooming from a wide-angle end to a telephoto end,
wherein the first lens unit is fixed relative to an image plane during zooming from the wide-angle end to the telephoto end,
wherein the first lens unit includes single lens having negative refractive power closest to an object, and a plurality of lenses having positive refractive powers disposed on the image side of the single lens,
wherein an air lens is formed by an air gap between the single lens and a lens adjacent to and disposed on the image side of the single lens, and
wherein the following inequalities are satisfied:

$-0.7<(r112+r111)/(r112-r111)<0.4$ $1.0 \leq f1/(-f2)<4.2$ $0.1<T1/f1<0.65$ where r111 is a radius of curvature of a lens surface on the object side of the single lens, r112 is a radius of curvature of a lens surface on the image side of the single lens, f1 is a focal length of the first lens unit, f2 is a focal length of the second lens unit, and T1 is a distance on an optical axis from a lens surface closest to the object of the first lens unit to a lens surface closest to the image plane of the first lens unit.

2. The zoom lens according to claim 1, wherein the following inequality is satisfied:

$0.5<-f2/fw<1.5$ where fw is a focal length of the zoom lens at the wide-angle end.

3. The zoom lens according to claim 1, wherein the following inequality is satisfied:

$1<f3/fw<10$ where f3 is a focal length of the third lens unit, and fw is a focal length of the zoom lens at the wide-angle end.

4. The zoom lens according to claim 1, wherein the following inequality is satisfied:

$0.2<BFw/fw<1.2$ where BFw is a back focus of the zoom lens at the wide-angle end, and fw is a focal length of the zoom lens at the wide-angle end.

5. The zoom lens according to claim 1, wherein the following inequality is satisfied:

$0.9<D12t/fw<2.5$ where D12t is a distance on an optical axis from the lens surface closest to the image plane of the first lens unit to a lens surface closest to the object of the second lens unit at the telephoto end, and fw is a focal length of the zoom lens at the wide-angle end.

6. The zoom lens according to claim 1, wherein the following inequality is satisfied:

$0.9<f21/f2<1.8$ where f21 is a focal length of a lens disposed closest to the object in the second lens unit.

7. The zoom lens according to claim 1, wherein the following inequality is satisfied:

$-2.0<\beta 2t<-0.3$ where β2t is imaging lateral magnification of the second lens unit at the telephoto end.

8. The zoom lens according to claim 1, wherein the following inequality is satisfied:

$0.02<T11/fw<0.20$ where T11 is a distance on the optical axis from a lens surface on the object side of the single lens to a lens surface on the image side of the single lens, and fw is a focal length of the zoom lens at the wide-angle end.

9. The zoom lens according to claim 1, wherein the following inequality is satisfied:

$0.03<D112/fw<0.30$ where D112 is a distance on an optical axis from a lens surface on the image side of the single lens to a lens surface on the object side of a lens adjacent to and disposed on the image side of the single lens, and fw is a focal length of the zoom lens at the wide-angle end.

10. The zoom lens according to claim 1, wherein the first lens unit includes three or more lenses having positive refractive powers disposed on the image side of the single lens.

11. The zoom lens according to claim 1, wherein the rear group consists of three or more lens units.

12. The zoom lens according to claim 1, wherein the rear group includes a plurality of lens units configured to move during zooming from the wide-angle end to the telephoto end.

13. The zoom lens according to claim 1, wherein the rear group includes a plurality of lens units configured to move toward the object side during zooming from the wide-angle end to the telephoto end.

14. The zoom lens according to claim 1, wherein all lenses included in the first lens unit are fixed during focusing.

15. The zoom lens according to claim 1, wherein the rear group includes a lens unit configured to move during focusing.

16. The zoom lens according to claim 1, wherein the second lens unit includes three or more lenses having negative refractive powers.

17. The zoom lens according to claim 1, wherein the third lens unit includes a plurality of lenses having positive refractive powers.

18. The zoom lens according to claim 1, wherein the third lens unit includes a lens having negative refractive power.

19. The zoom lens according to claim 1, wherein the following inequality is satisfied:

$$0.6 < f11/f1 < 1.4$$

where f11 is a focal length of the single lens.

20. An image pickup apparatus comprising:
   a zoom lens; and
   an image sensor configured to receive image light formed by the zoom lens,
   the zoom lens comprising a plurality of lens units, the plurality of lens units consisting of, in order from an object side to an image side, a first lens unit having positive refractive power, a second lens unit having negative refractive power, a third lens unit having positive refractive power, and a rear group including two or more lens units,
   wherein a distance between adjacent lens units changes during zooming from a wide-angle end to a telephoto end,
   wherein the first lens unit is fixed relative to an image plane during zooming from the wide-angle end to the telephoto end,
   wherein the first lens unit includes single lens having negative refractive power closest to an object, and a plurality of lenses having positive refractive powers disposed on the image side of the single lens,
   wherein an air lens is formed by an air gap between the single lens and a lens adjacent to and disposed on the image side of the single lens, and
   wherein the following inequalities are satisfied:

$$-0.7 < (r112+r111)/(r112-r111) < 0.4$$

$$1.0 < f1/(-f2) < 4.2$$

$$0.1 < T1/f1 < 0.65$$

where r111 is a radius of curvature of a lens surface on the object side of the single lens, r112 is a radius of curvature of a lens surface on the image side of the single lens, f1 is a focal length of the first lens unit, f2 is a focal length of the second lens unit, and T1 is a distance on an optical axis from a lens surface closest to the object of the first lens unit to a lens surface closest to the image plane of the first lens unit.

* * * * *